(12) United States Patent
Cherian et al.

(10) Patent No.: US 10,158,474 B2
(45) Date of Patent: Dec. 18, 2018

(54) BLOCK ACKNOWLEDGEMENT MECHANISM FOR ACKNOWLEDGING DL-MU DATA ON UL-MU WIRELESS COMMUNICATION SYSTEM

(71) Applicant: QUALCOMM Incorporated, San Diego, CA (US)

(72) Inventors: George Cherian, San Diego, CA (US); Simone Merlin, San Diego, CA (US); Gwendolyn Denise Barriac, Encinitas, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 15/145,756

(22) Filed: May 3, 2016

(65) Prior Publication Data

US 2016/0330007 A1 Nov. 10, 2016

Related U.S. Application Data

(60) Provisional application No. 62/157,921, filed on May 6, 2015.

(51) Int. Cl.
| | |
|---|---|
| *H04L 1/16* | (2006.01) |
| *H04L 1/18* | (2006.01) |
| *H04L 5/00* | (2006.01) |
| *H04W 72/04* | (2009.01) |
| *H04B 7/0452* | (2017.01) |

(52) U.S. Cl.
CPC .......... *H04L 5/0055* (2013.01); *H04L 1/1614* (2013.01); *H04L 1/1685* (2013.01);
(Continued)

(58) Field of Classification Search
CPC ... H04L 5/0055; H04L 1/1614; H04L 1/1685; H04L 1/1854; H04L 1/1861; H04W 72/0413; H04W 72/042; H04W 72/0453
(Continued)

(56) References Cited

U.S. PATENT DOCUMENTS

| | | |
|---|---|---|
| 2009/0196364 A1 | 8/2009 | Nakajima et al. |
| 2009/0252100 A1 | 10/2009 | Sridhara et al. |

(Continued)

OTHER PUBLICATIONS

International Search Report and Written Opinion—PCT/US2016/030820—ISA/EPO—dated Aug. 11, 2016.
(Continued)

*Primary Examiner* — Christopher R Crompton
(74) *Attorney, Agent, or Firm* — Arent Fox, LLP and Qualcomm, Incorporated

(57) ABSTRACT

A method, an apparatus, and a computer-readable medium for wireless communication are provided. The apparatus may be a first user terminal. The first user terminal receives, on a first DL communication channel of multiple DL communication channels, a DL MU PPDU includes MPDUs transmitted from an access point to multiple user terminals including the first user terminal on the multiple DL communication channels. The first user terminal obtains an UL channel indication and a BA indication. The first user terminal transmits, on a first UL communication channel of multiple UL communication channels, a first BA to the access point based on the UL channel indication and the BA indication simultaneously or concurrently with a BA transmission from the rest of the multiple user terminals to the access point on the rest of the multiple UL communication channels. The first BA acknowledges one or more of the MPDUs.

40 Claims, 11 Drawing Sheets

(52) U.S. Cl.
CPC .......... *H04L 1/1854* (2013.01); *H04L 1/1861* (2013.01); *H04W 72/042* (2013.01); *H04W 72/0413* (2013.01); *H04W 72/0453* (2013.01); *H04B 7/0452* (2013.01)

(58) Field of Classification Search
USPC ........................................................ 370/329
See application file for complete search history.

(56) References Cited

U.S. PATENT DOCUMENTS

| | | | |
|---|---|---|---|
| 2010/0220654 A1* | 9/2010 | Wentink | H04B 7/0417 370/328 |
| 2010/0220678 A1* | 9/2010 | Wentink | H04W 72/1289 370/329 |
| 2010/0322166 A1* | 12/2010 | Sampath | H04W 72/121 370/329 |
| 2012/0320896 A1 | 12/2012 | Choi et al. | |
| 2015/0036634 A1 | 2/2015 | Murakami et al. | |
| 2015/0063190 A1* | 3/2015 | Merlin | H04L 5/0037 370/312 |
| 2016/0285608 A1* | 9/2016 | Kwon | H04L 5/0055 |
| 2017/0149547 A1* | 5/2017 | Kim | H04L 5/0055 |
| 2017/0272138 A1* | 9/2017 | Chun | H04B 7/0613 |
| 2017/0338931 A1* | 11/2017 | Kim | H04L 1/16 |
| 2018/0034595 A1* | 2/2018 | Kim | H04L 1/1671 |

OTHER PUBLICATIONS

European Search Report—EP18175526—Search Authority—The Hague—dated Aug. 22, 2018.

* cited by examiner

BLOCK ACKNOWLEDGEMENT MECHANISM FOR ACKNOWLEDGING DL-MU DATA ON UL-MU WIRELESS COMMUNICATION SYSTEM

CROSS-REFERENCE TO RELATED APPLICATION(S)

This application claims the benefit of U.S. Provisional Application Ser. No. 62/157,921, entitled "BLOCK ACKNOWLEDGMENT MECHANISM FOR ACKNOWLEDGING DL-MU DATA ON UL-MU WIRELESS COMMUNICATION SYSTEM" and filed on May 6, 2015, which is expressly incorporated by reference herein in its entirety.

BACKGROUND

Field

Certain aspects of the present disclosure generally relate to wireless communications, and more particularly, to a block acknowledgement mechanism for acknowledging downlink multi-user data on an uplink multi-user wireless communication system.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs.

In certain systems with the single user uplink procedure, each block acknowledgment (BA) subsequent to the immediate BAs is polled using a block acknowledgment request (BARs). Thus, there is a need for a more efficient uplink BA mechanism for acknowledging downlink multi-user packets.

SUMMARY

In an aspect of the disclosure, a method, a computer-readable medium, and an apparatus are provided. The apparatus may be a first user terminal. The first user terminal receives, on a first downlink (DL) communication channel of a plurality of DL communication channels, a DL multi-user (MU) physical layer convergence procedure (PLCP) protocol data unit (PPDU) transmitted from an access point to a plurality of user terminals including the first user terminal and a second user terminal on the plurality of DL communication channels. The DL MU PPDU includes a plurality of medium access control (MAC) protocol data units (MPDUs). The first user terminal transmits, on a first uplink (UL) communication channel of a plurality of UL communication channels, a first block acknowledgement (BA) to the access point concurrently with transmission of a second BA from the second user terminal to the access point on a second UL communication channel of the plurality of UL communication channel. The first BA acknowledges one or more of the plurality of MPDUs. In certain configurations, the first user terminal obtains an UL channel indication and a BA indication. The transmission of the first BA is based on the UL channel indication and the BA indication.

DETAILED DESCRIPTION

Figure 1:
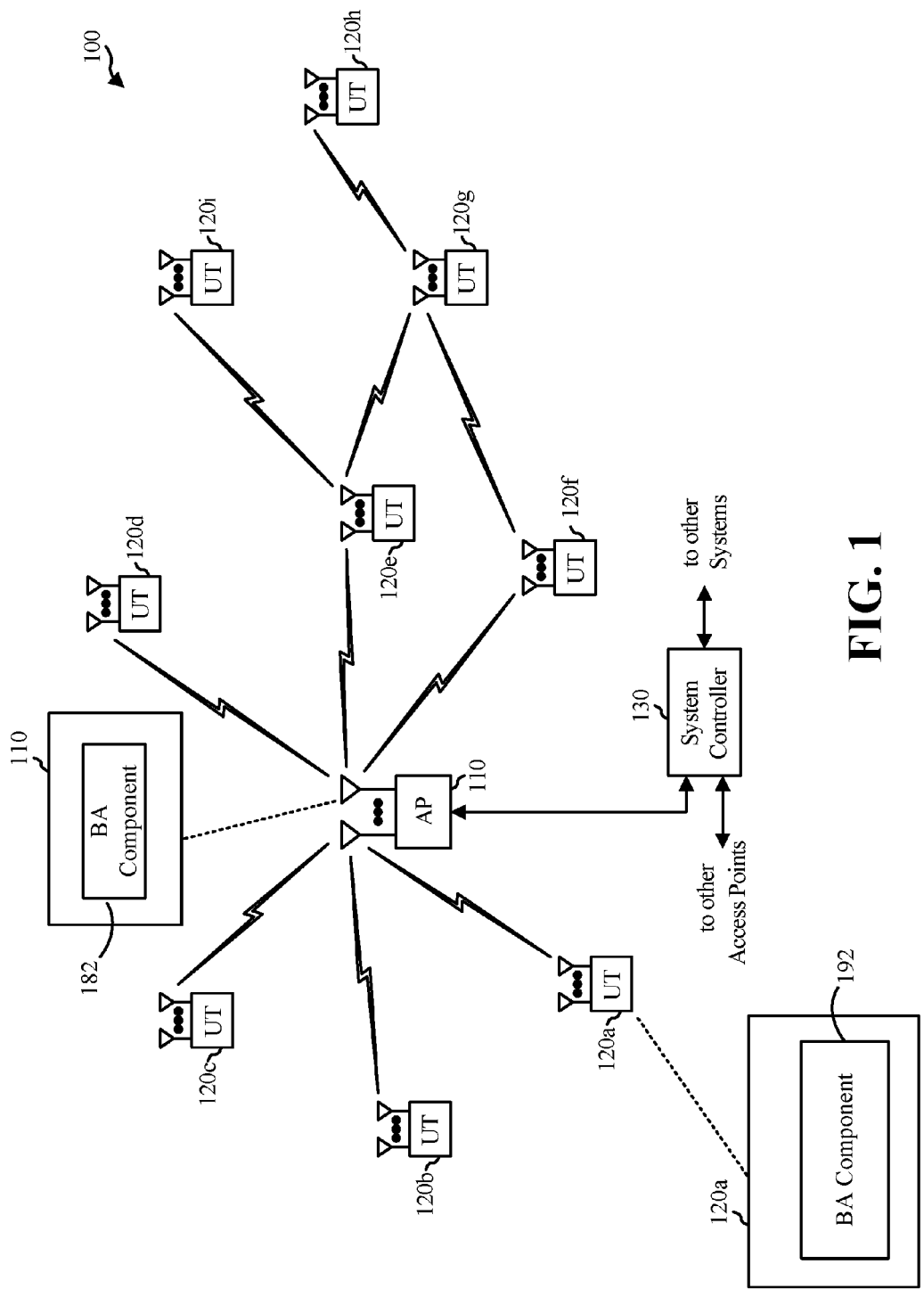
FIG. 1 is a diagram that illustrates a multiple-access multiple-input multiple-output (MIMO) system with access points and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points (APs) and clients (also referred to as stations, or STAs). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.1 1 protocol such as 802.11 ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously or concurrently transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point (AP) may comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

A station (STA) may also comprise, be implemented as, or known as a user terminal, an access terminal (AT), a subscriber station, a subscriber unit, a mobile station, a remote station, a remote terminal, a user agent, a user device, user equipment, or some other terminology. In some implementations, a STA may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatus will be described using a handshake protocol that requires an "association request" by one apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal or STA may be fixed or mobile and may also be referred to as a mobile station or a wireless device, or using some other terminology. The access point 110 may communicate with one or more user terminals (UTs) 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the access point 110 may be configured to communicate with both SDMA and non-SDMA user terminals. This approach may conveniently allow older versions of user terminals (legacy stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Each of the user terminals 120 may include a UT BA component 192. For example, the UT BA component 192 of the user terminal 120a in conjunction with a receiver may receive, on a first DL communication channel of a plurality of DL communication channels, a DL MU PPDU transmitted from the access point 110 to two or more of the user terminals 120 on the plurality of DL communication channels. The DL MU PPDU includes a plurality of MPDUs. The UT BA component 192 in conjunction with a transmitter may transmit, on a first UL communication channel of a plurality of UL communication channels, a first BA to the access point 110 concurrently with transmission of a second BA from another user terminal 120 to the access point 110 on a second UL communication channel of the plurality of UL communication channel. The first BA acknowledges one or more of the plurality of MPDUs. In certain configurations, the UT BA component 192 obtains a UL channel indication and a BA indication. The transmission of the first BA is based on the UL channel indication and the BA indication.

The access point 110 may include an AP BA component 182. For example, the AP BA component 182 in conjunction with a transmitter may transmit, on a plurality of DL communication channels, a DL MU PPDU to two or more of the user terminals 120. The DL MU PPDU includes a plurality of MPDUs. The AP BA component 182 in conjunction with a receiver may receive a first BA from a first user terminal 120 on a first UL communication channel of a plurality of UL communication channels concurrently with a second BA from a second user terminal 120 on a second UL communication channel of the plurality of UL communication channel. The first and second BAs each acknowledge one or more of the plurality of MPDUs. In certain configurations, the AP BA component 182 sends a UL channel indication and a BA indication to the first and second user terminals 120. The transmission of the first and second BAs is based on the UL channel indication and the BA indication.

Figure 2:
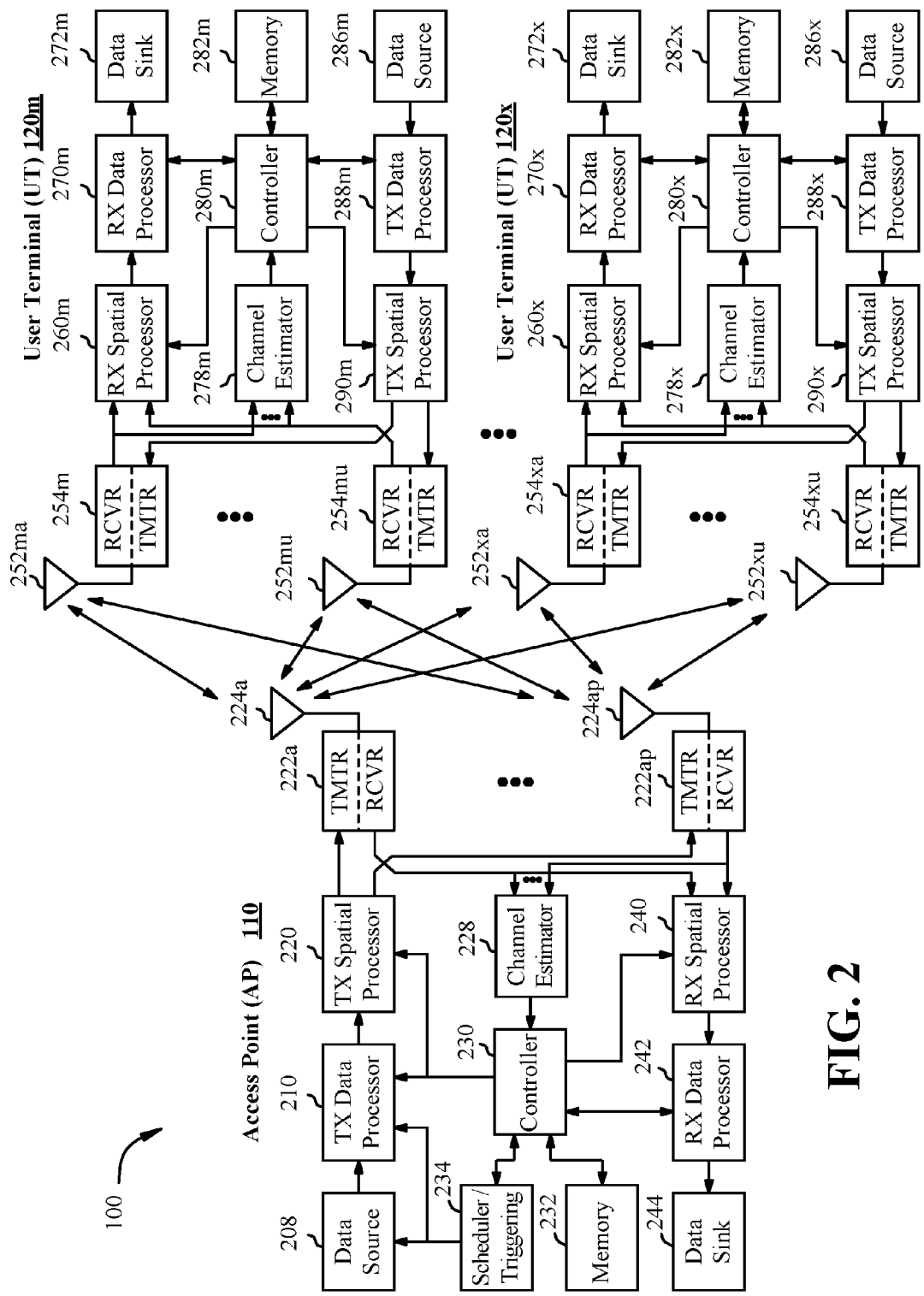
FIG. 2 illustrates a block diagram of an access point and two user terminals in MIMO system.

FIG. 2 illustrates a block diagram of the access point 110 and two user terminals 120m and 120x in a MIMO system 100. The access point 110 is equipped with $N_t$ antennas 224a through 224$_{ap}$. The user terminal 120m is equipped with $N_{ut,m}$ antennas 252$_{ma}$ through 252$_{mu}$, and the user terminal 120x is equipped with $N_{ut,x}$ antennas 252$_{xa}$ through 252$_{xu}$. The access point 110 is a transmitting entity for the downlink and a receiving entity for the uplink. The user terminal 120 is a transmitting entity for the uplink and a receiving entity for the downlink. As used herein, a transmitting entity is an independently operated apparatus or device capable of transmitting data via a wireless channel, and a receiving entity is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through 224$_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
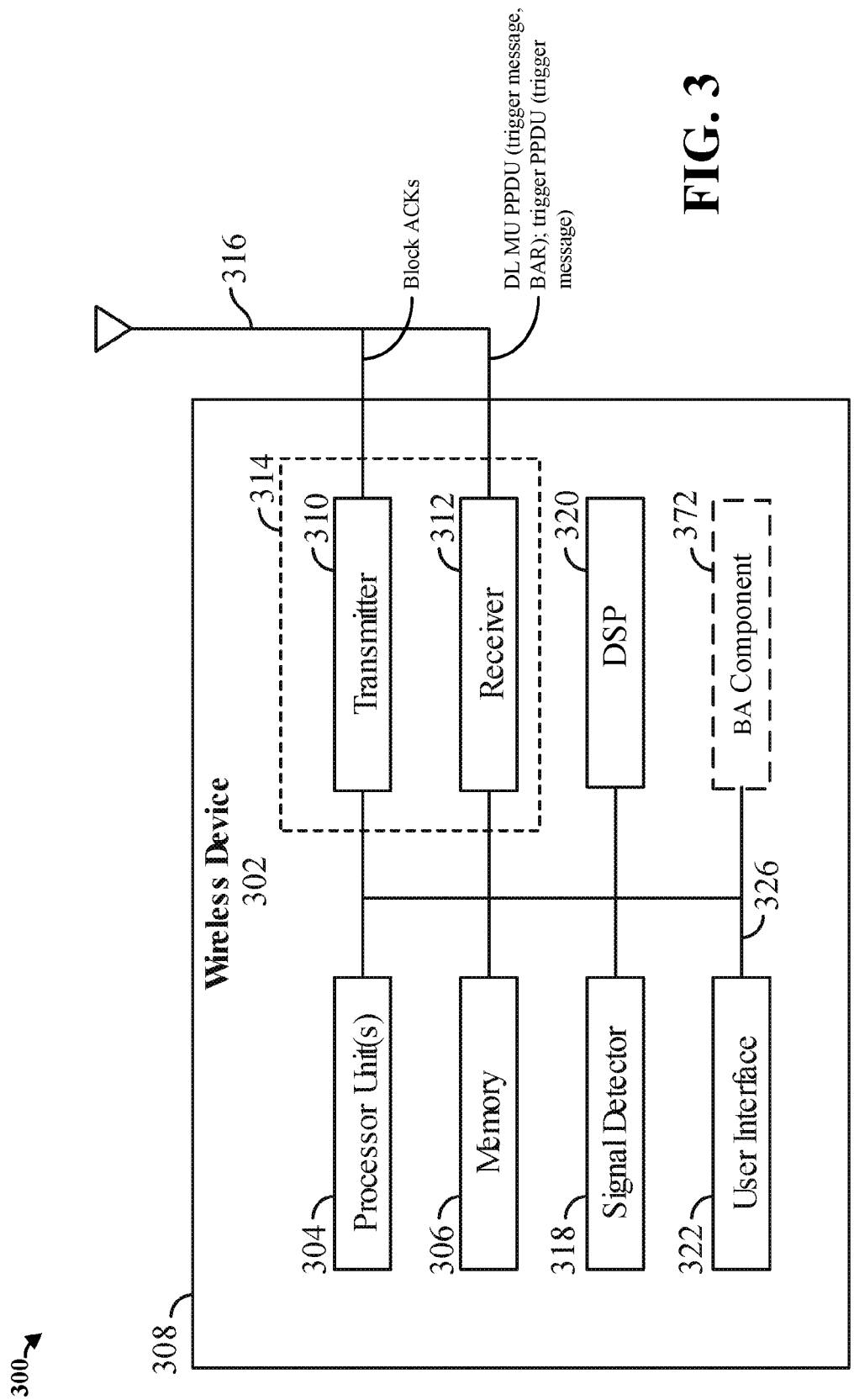
FIG. 3 illustrates various components that may be utilized in a wireless device that may be employed within the MIMO system.

FIG. 3 illustrates various components that may be utilized in a wireless device 302 that may be employed within the MIMO system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308, and the wireless device 302 may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a DSP 320 for use in processing signals.

In one aspect, the wireless device 302 may be a user terminal and may include a BA component 372 (e.g., the UT BA component 192). For example, the BA component 372 of the user terminal may receive, on a first DL communication channel of a plurality of DL communication channels, a DL MU PPDU transmitted from the access point to two or more of the user terminals on the plurality of DL communication channels. The DL MU PPDU includes a plurality of MPDUs. The BA component 372 in conjunction may transmit, on a first UL communication channel of a plurality of UL communication channels, a first BA to the access point concurrently with transmission of a second BA from another user terminal to the access point on a second UL communication channel of the plurality of UL communication channel. The first BA acknowledges one or more of the plurality of MPDUs. In certain configurations, the BA component 372 obtains a UL channel indication and a BA indication. The transmission of the first BA is based on the UL channel indication and the BA indication.

In another aspect, the wireless device 302 may be an access point and may include a BA component 372 (e.g., the AP BA component 182). For example, the BA component 372 may transmit, on a plurality of DL communication channels, a DL MU PPDU to two or more of the user terminals. The DL MU PPDU includes a plurality of MPDUs. The AP BA component 372 may receive a first BA from a first user terminal on a first UL communication channel of a plurality of UL communication channels concurrently with a second BA from a second user terminal on a second UL communication channel of the plurality of UL communication channel. The first and second BAs each acknowledge one or more of the plurality of MPDUs. In certain configurations, the BA component 372 sends a UL channel indication and a BA indication to the first and second user terminals. The transmission of the first and second BAs is based on the UL channel indication and the BA indication.

The various components of the wireless device 302 may be coupled together by a bus system 322, which may include a power bus, a control signal bus, and a status signal bus in addition to a data bus.

Certain aspects of the present disclosure support transmitting an UL signal from multiple UTs to an AP. In some embodiments, the UL signal may be transmitted in an MU-MIMO system. Alternatively, the UL signal may be transmitted in a multi-user FDMA (MU-FDMA) or similar FDMA system. In these embodiments, UL-MU-MIMO or UL-FDMA transmissions can be sent simultaneously or concurrently from multiple STAs to an AP and may create efficiencies in wireless communication.

Figure 4:
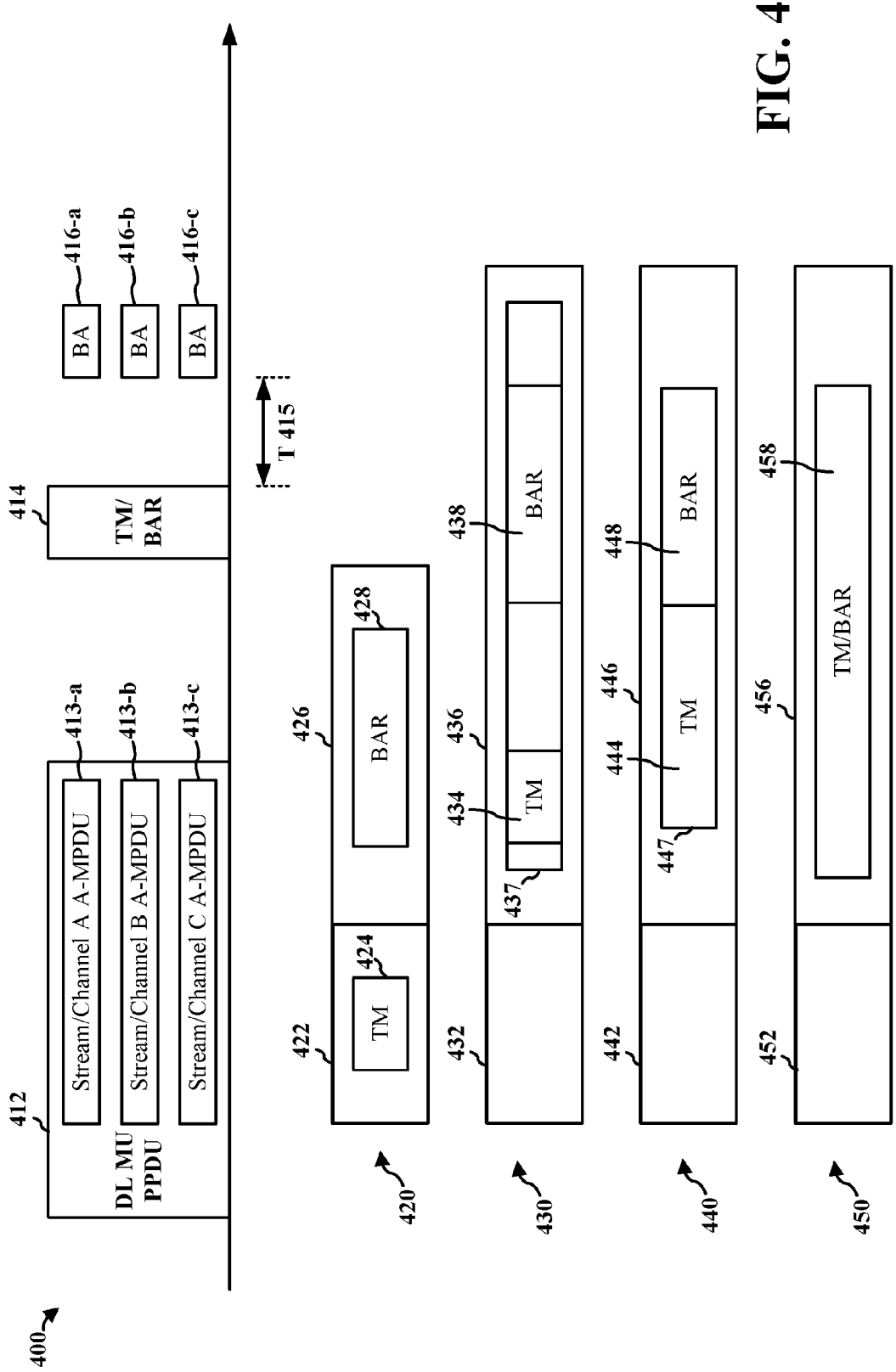
FIG. 4 is a diagram illustrating operations of transmitting BA frames in a DL/UL MU-MIMO system in one mechanism.

FIG. 4 is a diagram 400 illustrating operations of transmitting BA frames in a DL/UL MU-MIMO system in one mechanism. The access point 110 may transmit PPDUs to any suitable number of user terminals simultaneously or concurrently. In this example, for clarity and simplicity, FIG. 4 only illustrates that the access point 110 transmits a DL MU PPDU 412 to the user terminals 120a, 120b, 120c through multiple spatial streams/(O)FDMA channels (e.g., OFDMA or FDMA). The DL MU PPDU 412 includes aggregated MPDUs (A-MPDUs) 413-a, 413-b, 413-c. The access point 110 may transmit the A-MPDUs 413-a, 413-b, 413-c on spatial streams/(O)FDMA channels A, B, and C, and may be received by the user terminals 120a, 120b, 120c, respectively. Each one of the A-MPDUs 413-a, 413-b, 413-c may include one or more MPDUs.

Further, the access point 110 sends a trigger message (TM)/BAR PPDU 414 to the user terminals 120a, 120b, 120c. The TM/BAR PPDU 414 may include a trigger message and a BAR message. The trigger message may include UL parameters that inform each of the user terminals 120a, 120b, 120c the spatial streams/(O)FDMA channels, the duration, and power to use to transmit UL PPDUs to the access point 110. The BAR message may request each of the user terminals 120a, 120b, 120c to send a BA to the access point 110 to acknowledge the MPDUs received at the user terminal. Subsequently, the user terminals 120a, 120b, 120c each may simultaneously or concurrently send a respective one of BA frames 416-a, 416-b, 416-c to the access point 110 through a respective one of multiple spatial streams/(O) FDMA channels that are allocated by the access point 110 and provided to the user terminal via the trigger message. In certain aspects of the present disclosure, simultaneous or concurrent transmission means that the user terminals start transmitting the BAs at the same or approximately the same time. The transmission of the BA at each user terminal may or may not stop at the same time point. In certain other aspects, simultaneous or concurrent transmission means that the transmission of a BA from one user terminal overlaps, in time, with the transmission of a BA from another user terminal.

In this example, each MPDU of the A-MPDUs 413-a, 413-b, 413-c may have an acknowledgement (ACK) policy set as "Block Ack," which indicates that a receiving user terminal should wait for a BAR before responding with a BA. In other words, none of the MPDUs has an ACK policy set as "Immediate Block Ack" (e.g., "Normal Ack" or "Implicit Block Ack Request"), which indicates that the receiving user terminal may send a BA immediately upon receiving the MPDU (e.g., a short interframe space (SIFS) after receiving the MPDU).

In a first technique, the TM/BAR PPDU 414 may implemented by a DL PPDU 420, which may be omnidirectional and directed to all the user terminals in the BSS of the access point 110. The DL PPDU 420 may include a preamble 422 and a data portion 426. The preamble 422 may include a trigger message 424. The data portion 426 may include a BAR frame 428 (e.g., the BAR message), which is in an A-MPDU. Thus, each of the user terminals 120a, 120b, 120c, upon receiving the DL PPDU 420, can obtain the trigger message 424 by demodulating the preamble 422 and obtain the BAR frame 428 by demodulating the data portion 426.

In a second technique, the TM/BAR PPDU 414 may be implemented by the DL PPDU 430, which may be omnidirectional and directed to all the user terminals in the BSS of the access point 110. The DL PPDU 430 may include the preamble 432 and the data portion 436. The data portion 436 may include the control wrapper frame 437, which is in an A-MPDU. The control wrapper frame 437 may wrap or contain a BAR frame 438. That is, the control wrapper frame 437 may carry the BAR frame 438 (e.g., the BAR message) in the carried frame field. Further, one field of the control wrapper frame 437 may carry a trigger message 434. Thus, each of the user terminals 120a, 120b, 120c, upon receiving the DL PPDU 430, can obtain the control wrapper frame 437 by demodulating the data portion 436. The user terminal 120a, 120b, or 120c may obtain the trigger message 434 and the BAR frame 438 from the control wrapper frame 437.

In a third technique, the TM/BAR PPDU 414 may be implemented by a DL PPDU 440, which may be omnidirectional and directed to all the user terminals in the BSS of the access point 110. The DL PPDU 440 includes a preamble 442 and a data portion 446. The data portion 446 includes an A-MPDU 447. The A-MPDU 447 includes a trigger frame 444 (e.g., the trigger message) and a BAR frame 448 (e.g., the BAR message). Thus, each of the user terminals 120a, 120b, 120c, upon receiving the DL PPDU 440, can obtain the trigger frame 444 and the BAR frame 448 by demodulating the data portion 436.

In a fourth technique, the TM/BAR PPDU 414 may be implemented by a DL PPDU 450, which may be omnidirectional and directed to all the user terminals in the BSS of the access point 110. The DL PPDU 450 includes a preamble 452 and a data portion 456. The data portion 456 includes a combined trigger/BAR frame 458, which is in an A-MPDU. The combined trigger/BAR frame 458 includes the trigger message and the BAR message. Thus, each of the user terminals 120a, 120b, 120c, upon receiving the DL PPDU 450, can obtain the combined trigger/BAR frame 458 by demodulating the data portion 436. The user terminal 120a, 120b, or 120c then obtains the trigger message and the BAR message from the combined trigger/BAR frame 458.

Using the techniques described above, each of the user terminals 120a, 120b, 120c may obtain the trigger message of the TM/BAR PPDU 414 and select a spatial stream/(O)FDMA channel based on the parameters set in the trigger message for transmitting UL PPDUs to the access point 110. Upon detecting the BAR message, the user terminal 120a, 120b, or 120c may transmit a respective one of the BA frames 416-a, 416-b, 416-c to the access point 110 at a time point that is a time period T 415 subsequent to the end point of the TM/BAR PPDU 414 on the selected spatial stream/(O)FDMA channel. The time period T 415 may be indicated in the trigger message by the access point 110. Alternatively, the time period T 415 may be preconfigured at the each of the user terminals 120a, 120b, 120c, for example, according to a standard. In certain configurations, the time period T 415 may be a SIFS.

Further, in certain configurations, each of the user terminals 120a, 120b, and/or 120c may be configured with a rule that the user terminal includes a BA frame at the beginning of a UL response. The user terminal 120a, 120b, or 120c may send other UL data after the BA frame is included. In addition, the access point 110 may send the TM/BAR PPDU 414 multiple times to collect BA frames from all the user terminals 120a, 120b, 120c.

Figure 5:
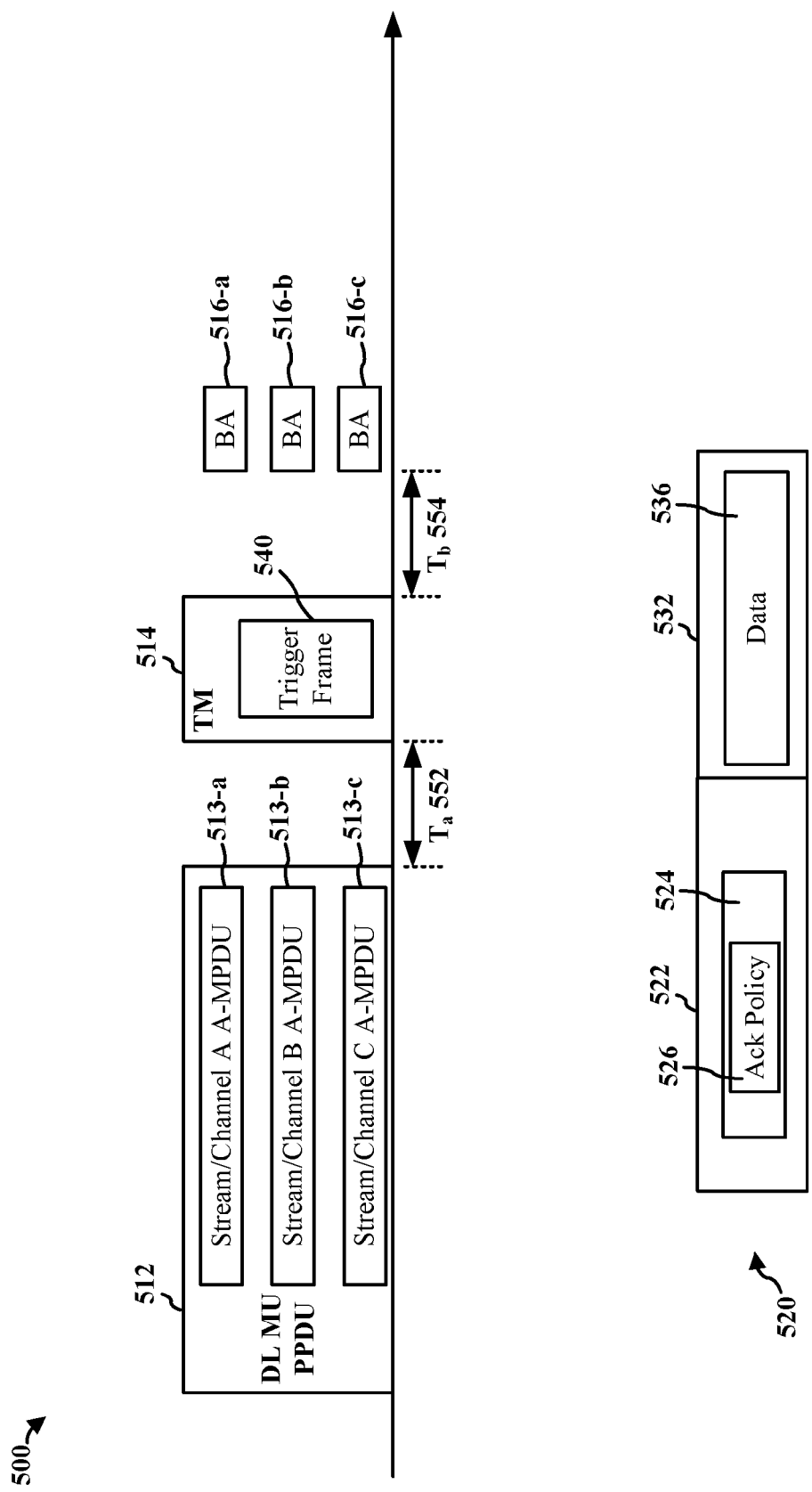
FIG. 5 is a diagram illustrating operations of transmitting BA frames in a DL/UL MU-MIMO system in another mechanism.

FIG. 5 is a diagram 500 illustrating operations of transmitting BA frames in a DL/UL MU-MIMO system in another mechanism. In this example, the access point 110 may transmit a DL MU PPDU 512 to the user terminals 120a, 120b, 120c through multiple spatial streams/(O)FDMA channels. The DL MU PPDU 512 may include A-MPDUs 513-a, 513-b, 513-c. The access point 110 may transmit the A-MPDUs 513-a, 513-b, 513-c on spatial streams/(O)FDMA channels A, B, and C, which are received by the user terminals 120a, 120b, 120c, respectively. Each one of the A-MPDUs 513-a, 513-b, 513-c may include one or more MPDUs.

Subsequently, the access point 110 sends a TM PPDU 514 to the user terminals 120a, 120b, 120c. The TM PPDU 514 may include a trigger message, which may be carried in a trigger frame 540. The trigger message may include parameters that inform each of the user terminals 120a, 120b, 120c the spatial streams/(O)FDMA channels, the duration, and power to use to transmit UL PPDUs to the access point 110. Subsequently, the user terminals 120a, 120b, 120c each may simultaneously or concurrently send a respective one of the BA frames 516-a, 516-b, 516-c to the access point 110 through a respective one of multiple spatial streams/(O)FDMA channels, which may be allocated by the access point 110 and indicated to the user terminal via the trigger message.

The MAC frame 520 is an exemplary MPDU that may be included in the A-MPDUs 513-a, 513-b, 513-c. The MAC Frame 520 has a frame header 522 and a frame body 532. The frame header 522 may include, among others, a quality of service (QoS) field 524. The QoS field 524 includes, among others, an ACK policy subfield 526. The frame body 532 includes the frame data 536.

The ACK policy in the ACK policy subfield 526 may be set to "Block Ack Upon Next Trigger," which indicates that a receiving user terminal should wait for a BA trigger before responding with a BA. The user terminal 120a, 120b, or 120c may be configured to prepare the BA in response to receiving an ACK policy set as "Block Ack Upon Next Trigger" similarly to in response to receiving an ACK policy set as "Immediate Block Ack" (e.g., "Normal Ack" or "Implicit Block Ack Request"). The user terminal 120a, 120b, or 120c, however, may only transmit the BA upon receiving the BA trigger.

After transmitting the DL MU PPDU 512, the access point 110 may transmit the TM PPDU 514 to the user terminals 120a, 120b, 120c. In certain configurations, the access point 110 is configured to send the TM PPDU 514 after a time period Ta 552 (e.g., a SIFS) subsequent to the endpoint of the DL MU PPDU 512. The TM PPDU 514 may include the trigger frame 540, which carries the trigger message and a BA trigger. The BA trigger may be set as a preconfigured value in a field of the trigger frame 540. The BA trigger signals each of the user terminals 120a, 120b, 120c to send, for MPDUs having the "Block Ack Upon Next Trigger" ACK policy, a BA frame to the access point 110 to acknowledge those MPDUs received at the user terminal.

The user terminals 120a, 120b, 120c each may simultaneously or concurrently send, after a time period Tb 554 subsequent to the endpoint of the TM PPDU 514, a respective one of the BA frames 516-a, 516-b, 516-c to the access point 110 through a respective one of the multiple spatial streams/(O)FDMA channels, which are allocated by the access point 110 via the trigger message. The user terminal 120a, 120b, or 120c may be preconfigured with a value for the time period Tb 554 in accordance with the "Block Ack Upon Next Trigger" ACK policy. For example, the time period Tb 554 may be a SIFS.

Further, in certain configurations, each of the user terminals 120a, 120b, 120c may be configured with a rule that the user terminal includes a BA frame at the beginning of a UL response. The user terminal 120a, 120b, or 120c may send other UL data after the BA frame is included.

Figure 6:
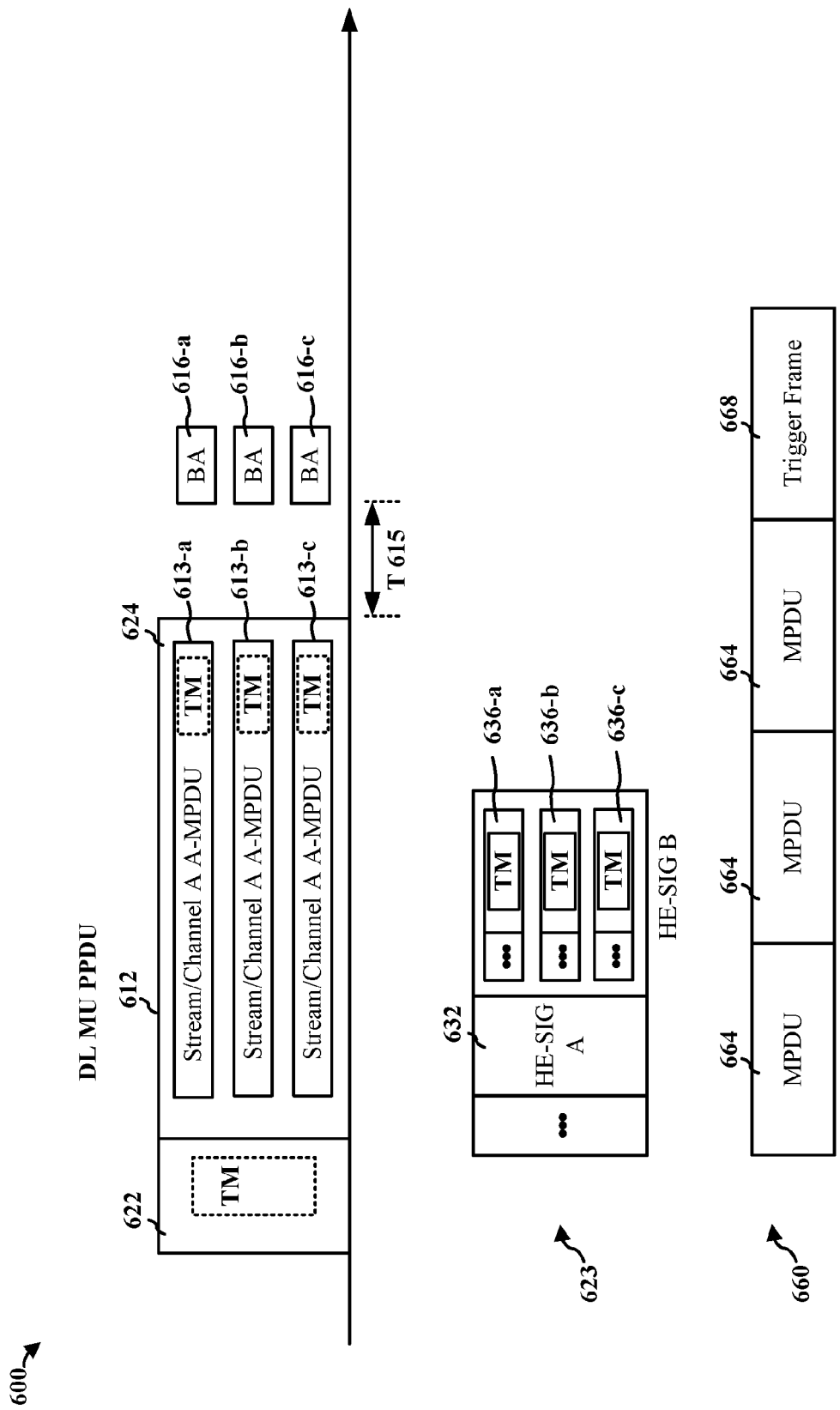
FIG. 6 is a diagram illustrating operations of transmitting BA frames in a DL/UL MU-MIMO system in yet another mechanism.

FIG. 6 is a diagram 600 illustrating operations of transmitting BA frames in a DL/UL MU-MIMO system in yet another mechanism. In this example, the access point 110 transmits a DL MU PPDU 612 to the user terminals 120*a*, 120*b*, 120*c* through multiple spatial streams/(O)FDMA channels. The DL MU PPDU 612 includes a preamble 622 and a data portion 624. The data portion 624 includes A-MPDUs 613-*a*, 613-*b*, 613-*c*. The access point 110 may transmit the A-MPDUs 613-*a*, 613-*b*, 613-*c* on spatial streams/(O)FDMA channels A, B, and C, respectively. Each one of the A-MPDUs 613-*a*, 613-*b*, 613-*c* includes one or more MPDUs. Further, the DL MU PPDU 612 may include a trigger message. The trigger message may include UL channel allocation parameters that inform each of the user terminals 120*a*, 120*b*, 120*c* the spatial streams/(O)FDMA channels, the duration, and power to use to transmit UL PPDUs to the access point 110. Subsequently, the user terminals 120*a*, 120*b*, 120*c* each may simultaneously or concurrently send a respective one of the BA frames 616-*a*, 616-*b*, 616-*c* to the access point 110 through a respective one of multiple spatial streams/(O)FDMA channels, which may be allocated by the access point 110 and informed to the user terminal via the trigger message.

In a first technique, the trigger message may be included in the preamble 622. In certain configurations, the preamble 622 may include omnidirectional fields such as a HE-SIG A 632. The preamble 622 may also include directional fields such as HE-SIG Bs 636-*a*, 636-*b*, 636-*c*. A respective trigger message may be included in each of the HE-SIG Bs 636-*a*, 636-*b*, 636-*c* for the corresponding user terminal receiving the respective spatial stream/(O)FDMA channel. For example, the trigger message included in the HE-SIG B 636-*a* may be directed to the user terminal (e.g., the user terminal 120*a*) receiving the spatial stream/(O)FDMA channel A and may include parameters for that user terminal to select a spatial stream/(O)FDMA channel to transmit UL PPDUs.

In a second technique, a trigger frame may be included in each of the A-MPDUs 613-*a*, 613-*b*, 613-*c*. The A-MPDU 660 is an exemplary A-MPDU that may be any one of the A-MPDUs 613-*a*, 613-*b*, 613-*c*. The A-MPDU 660 includes multiple MPDUs 664 and a trigger frame 668. The trigger frame 668 includes the trigger message. All the MPDUs 664 are addressed to the corresponding user terminal that receives the spatial stream/(O)FDMA channel carrying the A-MPDU 660. In certain configurations, the trigger frame 668 does not include the MAC address of the receiving user terminal. The trigger frame 668 is implied to have the same MAC address of the MPDUs 664. That is, the user terminal can determine that the receive address (RA) of the trigger frame 668 is the MAC address of the MPDUs 664, even when the RA of the trigger frame 668 is not set.

Further, the ACK policy of all the MPDUs of the A-MPDUs 613-*a*, 613-*b*, 613-*c* may be set to "Modified Immediate Block Ack Version 1," which indicates that the receiving user terminal is to send a BA at a time point that is a time period T 615 (e.g., a SIFS) after the end point of the DL MU PPDU 612. Alternatively, the ACK policy of all the MPDUs of the A-MPDUs 613-*a*, 613-*b*, 613-*c* may be set to "Modified Immediate Block Ack Version 2," which indicates that the receiving user terminal is to send, upon detecting the trigger message set in the DL MU PPDU 612, a BA at a time point that is the time period T 615 (e.g., a SIFS) after the end point of the DL MU PPDU 612.

As previously discussed, the access point 110 may send the DL MU PPDU 612 to the user terminals 120*a*, 120*b*, 120*c*. The DL MU PPDU 612 may be constructed utilizing the techniques described above. Subsequently, the user terminals 120*a*, 120*b*, 120*c* each may simultaneously or concurrently send, at the time point that is the time period T 615 subsequent to the endpoint of the DL MU PPDU 612, a respective one of the BA frames 616-*a*, 616-*b*, 616-*c* to the access point 110 through a respective one of multiple spatial streams/(O)FDMA channels, which may be allocated by the access point 110 and informed to the user terminal via the trigger message. In addition, the user terminal 120*a*, 120*b*, or 120*c* may be preconfigured with the time period T 615 in accordance with the "Modified Immediate Block Ack Version 1" or "Modified Immediate Block Ack Version 2" ACK policy. For example, the time period T 615 may be a SIFS.

Further, in certain configurations, each of the user terminals 120*a*, 120*b*, 120*c* may be configured with a rule that the user terminal includes a BA frame at the beginning of a UL response. The user terminal 120*a*, 120*b*, or 120*c* may send other UL data after the BA frame is included.

Figure 7:
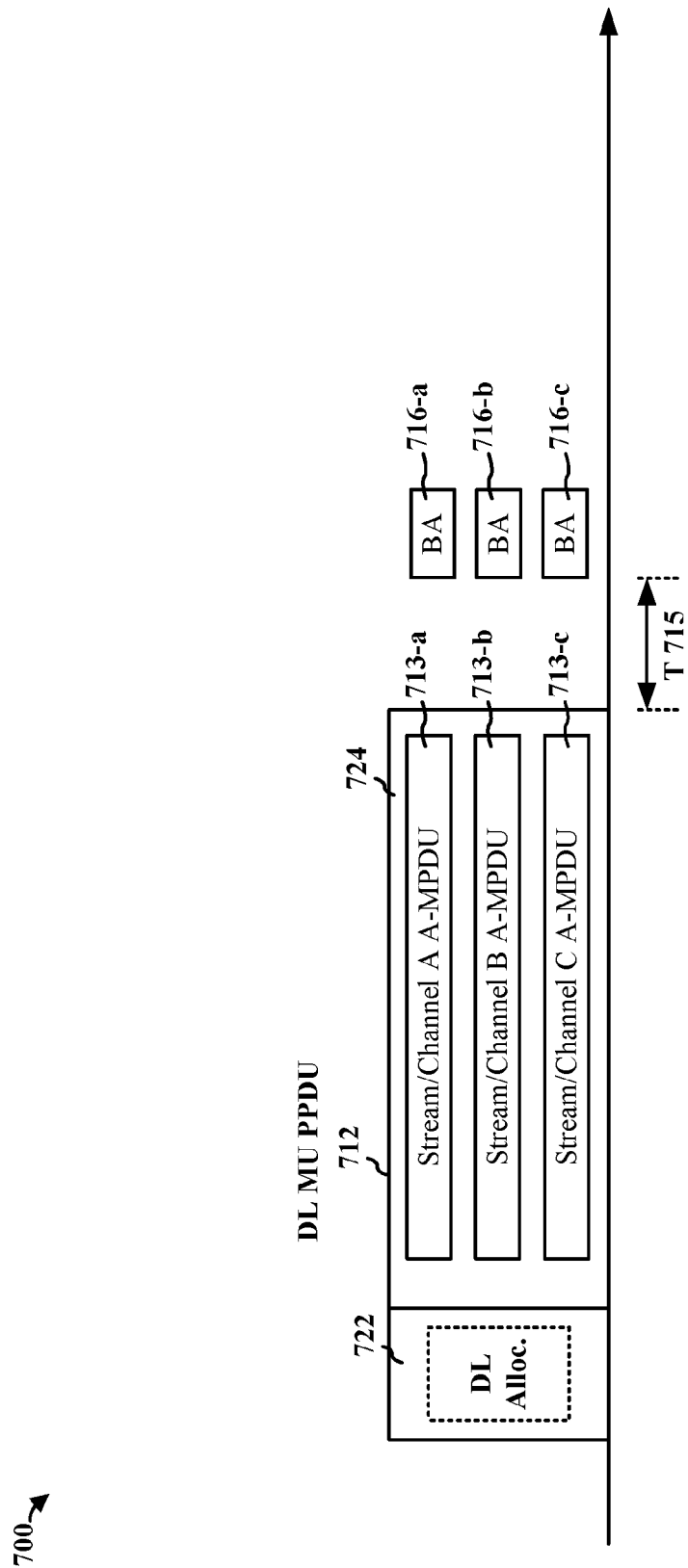
FIG. 7 is a diagram illustrating operations of transmitting BA frames in a DL/UL MU-MIMO system in another mechanism.

FIG. 7 is a diagram 700 illustrating operations of transmitting BA frames in a DL/UL MU-MIMO system in another mechanism. In this example, the access point 110 transmits a DL MU PPDU 712 to the user terminals 120*a*, 120*b*, 120*c* through multiple spatial streams/(O)FDMA channels. The DL MU PPDU 712 includes a preamble 722 and a data portion 724. The data portion 724 includes A-MPDUs 713-*a*, 713-*b*, 713-*c*. The access point 110 may transmit the A-MPDUs 713-*a*, 713-*b*, 713-*c* on spatial streams/(O)FDMA channels A, B, and C, which are received by the user terminals 120*a*, 120*b*, 120*c*, respectively. The preamble 722 includes DL resource allocation parameters indicating configurations of the spatial streams/(O)FDMA channels A, B, and C. Each one of the A-MPDUs 713-*a*, 713-*b*, 713-*c* includes one or more MPDUs. In contrast to the examples described above, in this example the DL MU PPDU 712 may not include a trigger message.

Each of the user terminals 120*a*, 120*b*, 120*c* may be configured to send, upon receiving an A-MPDU on a respective spatial stream/(O)FDMA channel, a BA to the access point 110 on a reciprocal UL spatial stream/(O)FDMA channel at the time point that is a time period T 715 subsequent to the endpoint of the DL MU PPDU 712. Particularly, the reciprocal UL spatial stream/(O)FDMA channel may be in the reverse direction of the DL spatial stream/(O)FDMA channel carrying the A-MPDU and otherwise has the same configurations as the DL spatial stream/(O)FDMA channel. That is, the reciprocal UL spatial stream/(O)FDMA channel may have the same frequency and other configurations as the DL spatial stream/(O)FDMA channel except that the reciprocal UL spatial stream/(O)FDMA channel is reserved for transmission from a STA to an AP (rather than from an AP to a STA). Further, the reciprocal UL spatial stream/(O)FDMA channel may include resources at a different time period than the DL spatial stream/(O)FDMA channel, but the other configurations may be the same. For example, the DL spatial stream/(O)FDMA channel may have resources in first frequency at time $T_1$ for traffic from the AP to a STA. The reciprocal UL spatial stream/(O)FDMA channel may have resources at the same first frequency but at time $T_2$ for traffic from the STA to the AP. In certain configurations, the ACK policy of all the MPDUs of the A-MPDUs 713-*a*, 713-*b*, 713-*c* may be set to "Modified Immediate Block Ack Version 1," which indicates that the receiving user terminal is to send a BA at the time point that is the time period T 715 (e.g., a SIFS) after the end point of the DL MU PPDU 712. The UL spatial stream/(O)FDMA channel is determined based on the DL resource allocation parameters of the respective DL spatial stream/(O)FDMA channel, which are extracted from the preamble 722 of the DL MU PPDU 712. As such, the user terminals 120*a*, 120*b*, 120c each may simultaneously or concurrently send a respective one of the BA frames 716-a, 716-b, 716-c to the access point 110 through a respective one of multiple reciprocal spatial streams/(O)FDMA channels.

Figure 8:
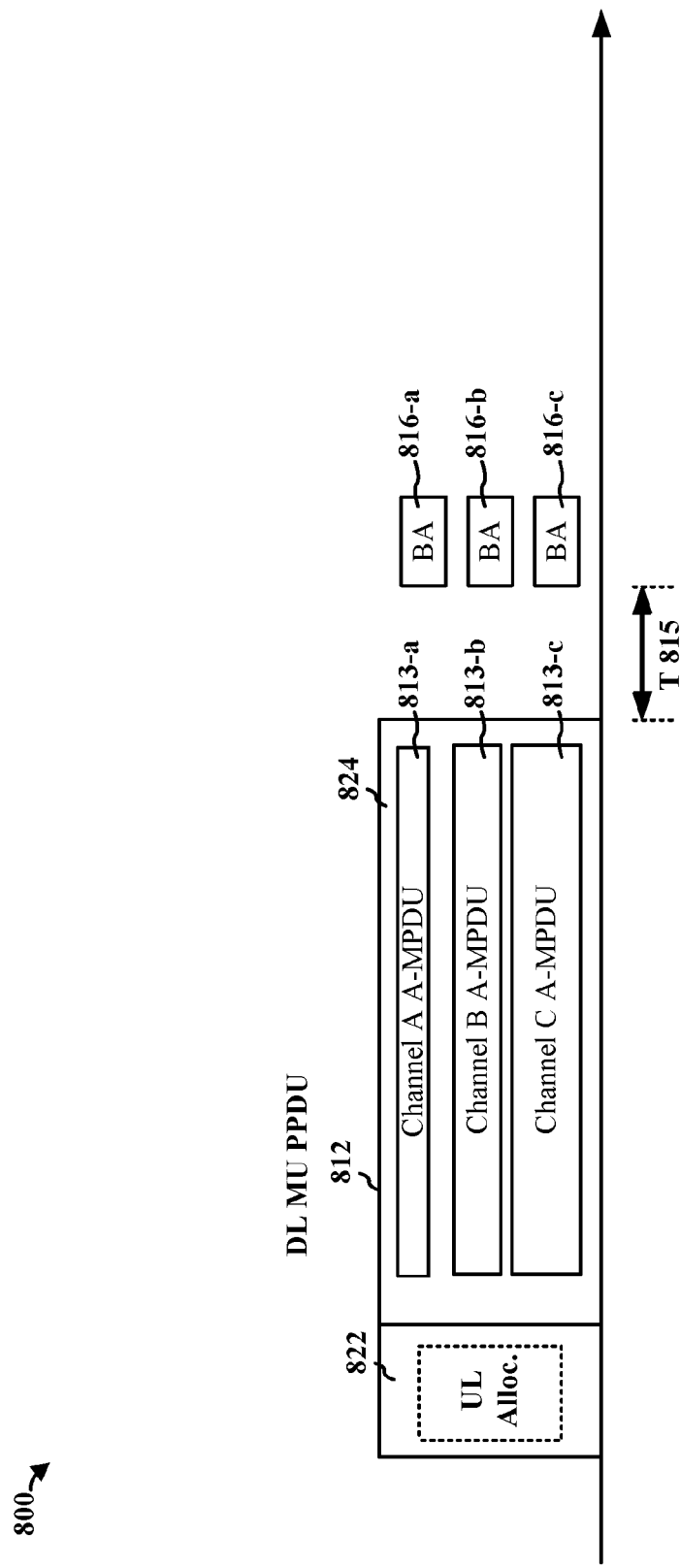
FIG. 8 is a diagram illustrating operations of transmitting BA frames in a DL/UL MU-MIMO system in yet another mechanism.

FIG. 8 is a diagram 800 illustrating operations of transmitting BA frames in a DL/UL MU-MIMO system in yet another mechanism. In this example, the access point 110 transmits a DL MU PPDU 812 to the user terminals 120a, 120b, 120c through multiple (O)FDMA channels. The DL MU PPDU 812 includes a preamble 822 and a data portion 824. The data portion 824 includes the A-MPDUs 813-a, 813-b, 813-c. Each one of the A-MPDUs 813-a, 813-b, 813-c includes one or more MPDUs. The access point 110 may transmit the A-MPDUs 813-a, 813-b, 813-c on (O)FDMA channels A, B, and C, which are received by the user terminals 120a, 120b, 120c, respectively.

In a first technique, the preamble 822 includes UL resource allocation parameters indicating configurations of the UL (O)FDMA channels for the user terminals 120a, 120b, 120c to transmit BAs. Particularly, the bandwidth of each of the UL (O)FDMA channels may be same. The UL resource allocation parameters may indicate the bandwidth of each channel and an UL channel index assigned to each of the user terminals 120a, 120b, 120c. In contrast to the examples described above, in this example the DL MU PPDU 812 may not include a trigger message.

In the first technique, each of the user terminals 120a, 120b, 120c may be configured to send, upon receiving an A-MPDU on a respective (O)FDMA channel, a BA to the access point 110 on a selected UL (O)FDMA channel at the time point that is a time period T 815 subsequent to the endpoint of the DL MU PPDU 812. In certain configurations, the ACK policy of all the MPDUs of the A-MPDUs 813-a, 813-b, 813-c may be set to "Send BA in UL MU PPDU," which indicates that the receiving user terminal is to send a BA at the time point that is the time period T 815 (e.g., a SIFS) after the end point of the DL MU PPDU 812. The bandwidth and index of the UL (O)FDMA channel to be used by the user terminal 120a, 120b, or 120c is obtained from the UL resource allocation parameters.

In a second technique, the preamble 822 does not include UL resource allocation parameters indicating configurations of the UL (O)FDMA channels for the user terminals 120a, 120b, 120c to transmit BAs. Each of the user terminals 120a, 120b, 120c, however, may be configured with information of a common bandwidth of a UL (O)FDMA channels for transmitting a BA. Alternatively or in addition, each of the user terminals 120a, 120b, 120c may be configured with information of the total UL bandwidth and the number of UL (O)FDMA channels. In contrast to the examples described above, in this example the DL MU PPDU 812 may not include a trigger message.

In the second technique, each of the user terminals 120a, 120b, 120c may determine the channel index of the DL (O)FDMA channel on which a respective one of the A-MPDUs 813-a, 813-b, 813-c is received. The user terminal 120a, 120b, or 120c may use the same channel index to select an UL (O)FDMA channel for transmitting a BA. The user terminals 120a, 120b, 120c each may be configured to send, upon receiving an A-MPDU on a respective (O)FDMA channel, a BA to the access point 110 on a selected UL (O)FDMA channel at the time point that is the time period T 815 subsequent to the endpoint of the DL MU PPDU 812. In certain configurations, the ACK policy of all the MPDUs of the A-MPDUs 813-a, 813-b, 813-c may be set to "Send BA in UL MU PPDU," which indicates that the receiving user terminal is to send a BA at the time point that is the time period T 815 (e.g., a SIFS) after the end point of the DL MU PPDU 812.

As such, the user terminals 120a, 120b, 120c each may simultaneously or concurrently send a respective one of the BA frames 816-a, 816-b, 816-c to the access point 110 through a respective one of the multiple UL (O)FDMA channels.

Figure 9:
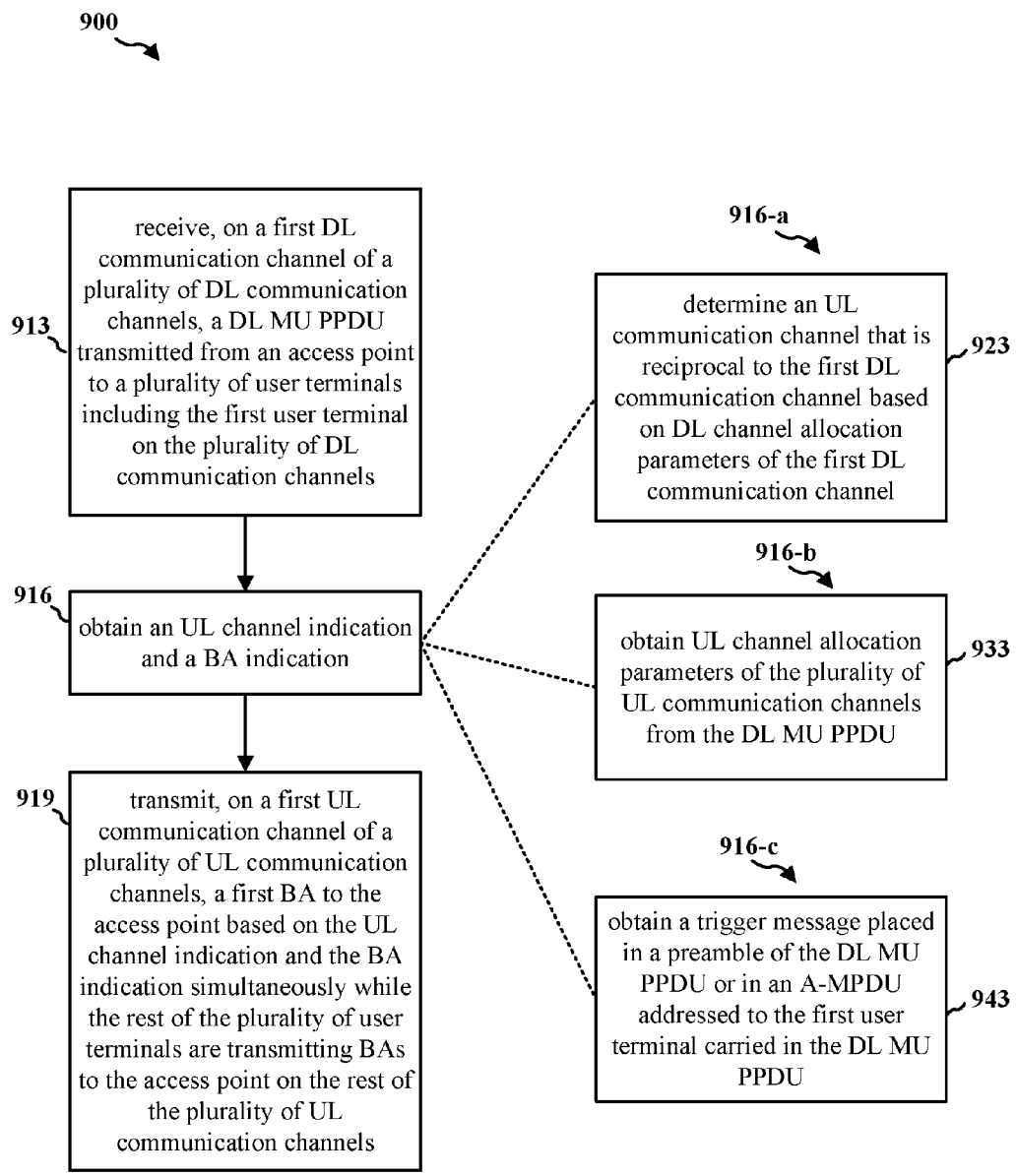
FIG. 9 is a flow chart of a method (process) of transmitting BAs on multiple UL communication channels simultaneously or concurrently.

FIG. 9 is a flow chart 900 of a method (process) of transmitting BAs on multiple UL communication channels simultaneously or concurrently. The method may be performed by a first user terminal (e.g., the user terminals 120, the wireless device 302).

The first user terminal, at operation 913, may receive, on a first DL communication channel of a plurality of DL communication channels, a DL MU PPDU transmitted from an access point to a plurality of user terminals including the first user terminal on the plurality of DL communication channels. The DL MU PPDU may include a plurality of MPDUs. For example, referring to FIGS. 1 and 4, the user terminal 120a may receive, on the OFDMA channel A of OFDMA channels A, B, C, the DL MU PPDU 412 transmitted by the access point 110 to user terminals 120a, 120b, 120c. The DL MU PPDU 412 may include a number of MPDUs.

At operation 916, the first user terminal obtains an UL channel indication and a BA indication. In one example, referring to FIGS. 1 and 4, the user terminal 120a may obtain the UL channel indication by receiving the TM/BAR PPDU 414, which includes UL parameters that indicate the spatial streams, (O)FDMA channels, duration, and power to use for transmitting UL PPDUs to the access point 110. In this example, the user terminal 120a may receive a BA indication in each MPDU of the A-MPDUs 413-a, 413-b, 413-c. The BA indication may include the ACK policy for each MPDU. As shown in FIG. 5, the MPDU may be configured as the MAC frame 520, and the ACK policy may be contained in the ACK policy subfield 526. The ACK policy may be set to "Block ACK Upon Next Trigger," which indicates that the user terminal 120a should wait for a BA trigger before responding with a BA.

In another example, referring to FIGS. 1 and 6, the user terminal 120a may obtain the UL channel indication by receiving the DL MU PPDU 612. The DL MU PPDU 612 may include a trigger message in the preamble 622 (e.g., in the HE-SIG field). The user terminal 120a may demodulate the preamble to obtain the UL channel indication, which may include parameters for the user terminal 120a to select an (O)FDMA channel for transmitting UL PPDUs among other parameters. In this example, each MPDU of the A-MPDUs 613-a, 613-b, 613-c may include the BA indication that contains the ACK policy.

In certain configurations, within operation 916, the first user terminal may, at operation 923 (or 916-a), determine an UL communication channel that is reciprocal to the first DL communication channel based on DL channel allocation parameters of the first DL communication channel. The UL channel indication is based on the DL channel allocation parameters. The first UL communication channel is the UL communication channel, which is reciprocal to the DL communication channel. The plurality of MPDUs each include an ACK policy that indicates a receiving user terminal to transmit a BA immediately on one of the plurality of UL communication channels. The BA indication includes the ACK policy. The first BA is transmitted in response to detecting the ACK policy in the plurality of MPDUs. Further, the first user terminal may determine the UL communication channel by obtaining the DL channel allocation parameters of the first DL communication channel from the DL MU PPDU and by determining UL channel allocation parameters based on the DL channel allocation parameters. The reciprocal UL communication channel may be determined based on the UL channel allocation parameters. For example, referring to FIGS. 1 and 7, the user terminal 120*a* may receive the DL MU PPDU 712. The preamble 722 of the DL MU PPDU 712 may include DL resource allocation parameters, including configurations for OFDMA channels A. The user terminal 120*a* may determine that the UL communication channel is the reciprocal of the DL communication channel after the time period T 715 has elapsed from the endpoint of the DL MU PPDU 712. The UL communication channel may have the same configuration as the DL communication channel, except traffic would flow in the opposite direction.

In certain configurations, within operation 916, the first user terminal may, at operation 933 (or 916-*b*), obtain UL channel allocation parameters of the plurality of UL communication channels from the DL MU PPDU. The UL channel allocation parameters may allocate equal bandwidth to each of the plurality of UL communication channels. The UL channel indication may include the UL channel allocation parameters. The first UL communication channel is determined based on the UL channel allocation parameters. The plurality of MPDUs each include an ACK policy that instructs a receiving user terminal to transmit a BA immediately on one of the plurality of UL communication channels. The BA indication includes the ACK policy. The first BA is transmitted in response to obtaining the UL channel allocation parameters and detecting the ACK policy in the plurality of MPDUs. For example, referring to FIG. 8, the user terminal 120*a* may receive the DL MU PPDU 812. The DL MU PPDU 812 may include UL resource allocation parameters (or the UL channel allocation parameters) within the preamble 822 of the DL MU PPDU 812 or within another portion of the DL MU PPDU 812.

In certain configurations, within operation 916, the first user terminal may, at operation 943 (or 916-*c*), obtain a trigger message from the DL MU PPDU. The trigger message is included in a preamble of the DL MU PPDU or in an aggregate MPDU (A-MPDU) addressed to the first user terminal carried in the DL MU PPDU. The trigger message signals the first user terminal to initiate UL transmission and includes UL channel allocation parameters. The first UL communication channel is determined based on the UL channel allocation parameters. The UL channel indication includes the UL channel allocation parameters. The plurality of MPDUs each include an ACK policy that indicates a receiving user terminal to transmit a BA immediately on one of the plurality of UL communication channels. The BA indication includes the ACK policy and may include the trigger message. The first BA is transmitted in response to obtaining the trigger message and detecting the ACK policy in the plurality of MPDUs. For example, referring to FIGS. 1 and 6, the user terminal 120*a* may obtain the trigger message by demodulating the preamble of the DL MU PPDU 612 (e.g., in the HE-SIG As 636-*a*, 636-*b*, 636-*c*). Alternatively, the trigger message may be included the A-MPDUs 613-*a*, 613-*b*, 613-*c*, and the user terminal 120*a* may demodulate the A-MPDUs 613-*a*, 613-*b*, 613-*c*.

At operation 919, the first user terminal transmits, on a first UL communication channel of a plurality of UL communication channels, a first BA to the access point based on the UL channel indication and the BA indication simultaneously or concurrently while the rest of the plurality of user terminals are transmitting BAs to the access point on the rest of the plurality of UL communication channels. The first BA acknowledges one or more of the plurality of MPDUs. In one example, referring to FIGS. 1 and 4, the user terminal 120*a* may transmit, on channel A of channels A, B, C, the BA frame 416-*a* to the access point 110 based on the UL channel indication and the BA indication. The transmission of the BA frame 416-*a* may be simultaneous or concurrent with the transmission of the BA frames 416-*b*, 416-*c* from the user terminals 120*b*, 120*c*, respectively.

In another example, referring to FIGS. 1 and 6, the user terminal 120*a* may transmit, on channel A of channels A, B, C, the BA frame 616-*a* to the access point 110 based on the UL channel indication and the BA indication. The transmission of the BA frame 616-*a* may be simultaneous or concurrent with the transmission of the BA frames 616-*b*, 616-*c* from the user terminals 120*b*, 120*c*, respectively.

In certain configurations, the first user terminal is configured to transmit UL data after sending the first BA on the first UL communication channel. In certain configurations, the A-MPDU includes a trigger frame that carries the trigger message. The trigger frame does not include a RA. The first user terminal is configured to determine the RA of the trigger frame based on an RA of another frame in the A-MPDU.

Figure 10:
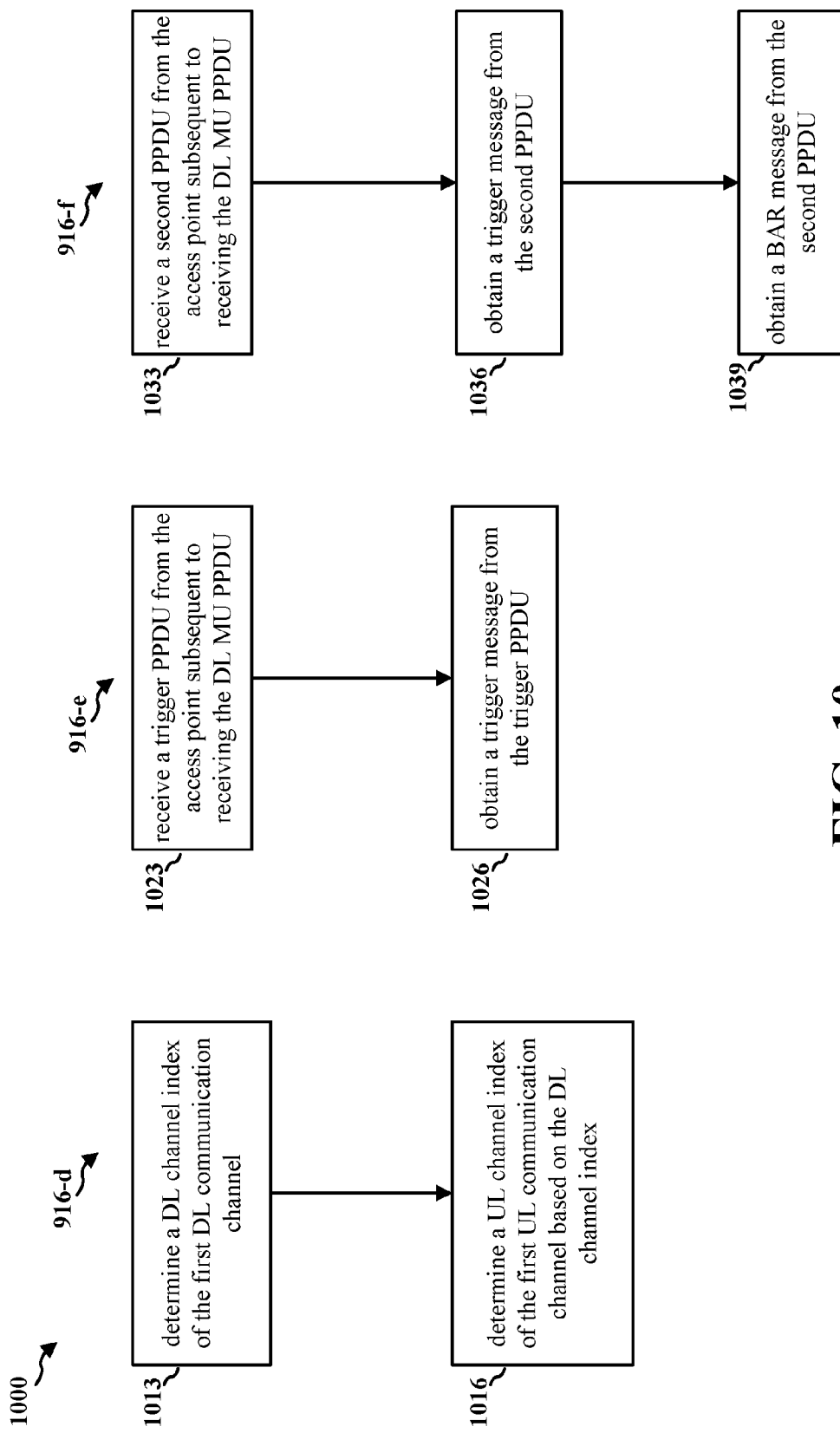
FIG. 10 is another flow chart of a method (process) of transmitting BAs on multiple UL communication channels simultaneously or concurrently.

FIG. 10 is another flow chart 1000 of a method (process) of transmitting BAs on multiple UL communication channels simultaneously or concurrently. The method may be performed by a first user terminal (e.g., the user terminals 120, the wireless device 302).

In certain configurations, the first user terminal is preconfigured with UL channel allocation parameters of the plurality of UL communication channels. The UL channel allocation parameters allocate equal bandwidth to each of the plurality of UL communication channels. Within operation 916 illustrated in FIG. 9, the first user terminal my perform operations of 916-*d*. The first user terminal may, at operation 1013, determine a DL channel index of the first DL communication channel. The UL channel indication includes the DL channel index. For example, referring to FIG. 8, the user terminal 120*a* may receive the DL MU PPDU 812, which may include the preamble 822. The preamble 822 may include the UL resource allocation parameters, which may indicate the DL channel index of the first DL communication channel. In an aspect, the DL channel index may be 1 (or some other number).

Subsequently at operation 1016, the first user terminal may determine a UL channel index of the first UL communication channel based on the DL channel index. The first UL communication channel is determined based on the UL channel allocation parameters and the UL channel index. The plurality of MPDUs each include an ACK policy that indicates a receiving user terminal to transmit a BA immediately on one of the plurality of UL communication channels. The BA indication includes the ACK policy. The first BA is transmitted in response to detecting the ACK policy in the plurality of MPDUs and the determination of the UL channel index. For example, referring to FIG. 8, the user terminal 120*a* may determine the UL channel index based on the DL channel index. The UL channel index may be the same as the DL channel index, or be an offset (e.g., a preconfigured offset) of the DL channel index (e.g., DL channel index+1). The user terminal 120*a* may obtain the UL channel indication based on the preconfigured UL channel allocation parameters, indicating all the available channels, and the UL channel index, which may be used to identify an UL communication channel among the available channels. In an aspect, the UL channel indication may identify the first UL communication channel.

In certain configurations, within operation 916 illustrated in FIG. 9, the first user terminal may perform operations associated with 916-e. For example, at operation 1023, the first user terminal may receive a trigger PPDU from the access point subsequent to receiving the DL MU PPDU. For example, referring to FIGS. 1 and 6, the user terminal 120a may receive the DL MU PPDU 612 (the trigger PPDU).

Subsequently at operation 1026, the first user terminal may obtain a trigger message from the trigger PPDU. The trigger message signals the first user terminal to initiate UL transmission and includes UL channel allocation parameters. The UL channel indication is associated with the UL channel allocation parameters. The first UL communication channel is determined based on the UL channel allocation parameters. The plurality of MPDUs each include an ACK policy that indicates a receiving user terminal to transmit a BA immediately upon receiving a trigger PPDU on one of the plurality of UL communication channels. The BA indication includes the ACK policy and the trigger message. The first BA is transmitted in response to obtaining the trigger message and detecting the ACK policy in the plurality of MPDUs. In certain configurations, the trigger PPDU includes a trigger frame that carries the trigger message. The trigger frame further includes an indication instructing a receiving user terminal to transmit a BA. For example, referring to FIGS. 1 and 6, the user terminal 120a may obtain the trigger message from the DL MU PPDU 612 by demodulating the preamble 822 and by extracting the trigger message from the preamble 822. The trigger message may instruct the user terminal 120a to initiate UL transmission and may include UL channel allocation parameters. The UL channel indication may be associated with the UL channel allocation parameters.

In certain configurations, within operation 916 illustrated in FIG. 9, the first user terminal may perform operations associated with 916-f. The first user terminal may, at operation 1033, receive a second PPDU from the access point subsequent to receiving the DL MU PPDU. For example, referring to FIGS. 1 and 4, the user terminal 120a may receive the TM/BAR PPDU 414 (the second PPDU) from the access point 110 after receiving the DL MU PPDU 412.

Subsequently at operation 1036, the first user terminal may obtain a trigger message from the second PPDU. The trigger message signals the first user terminal to initiate UL transmission and includes UL channel allocation parameters. The UL channel indication includes the UL channel allocation parameters. In one example, referring to FIGS. 1 and 4, the user terminal 120a may obtain the trigger message 424 by demodulating the preamble 422 of the TM/BAR PPDU 414 and extracting the trigger message. In another example, if the trigger message is placed in the control wrapper frame 437, the user terminal 120a may decode the control wrapper frame 437 and extract the trigger message 434 from the control wrapper frame 437.

Subsequently at operation 1039, the first user terminal may obtain a block acknowledgment request (BAR) message from the second PPDU. The BAR message signals the first user terminal to transmit a BA. The first UL communication channel is determined based on the UL channel allocation parameters. The plurality of MPDUs each include an ACK policy that indicates a receiving user terminal to transmit a BA in response to receiving the BAR message. The BA indication includes the ACK policy, the trigger message, and the BAR message. The first BA is transmitted in response to obtaining the trigger message and the BAR message. For example, referring to FIGS. 1 and 4, the user terminal 120a may obtain the BAR frame 428 by demodulating the data portion 426 of the TM/BAR PPDU 414 and by extracting the BAR frame 428. In another example, the user terminal 120a may obtain the BAR frame 438 by demodulating the control wrapper frame 437 and by extracting the BAR frame 438 in the carried frame field of the control wrapper frame 437.

As discussed above, in certain configurations, the trigger message is placed in a preamble of the second PPDU. The second PPDU includes a BAR frame carrying the BAR message. In certain configurations, the second PPDU carries a control wrapper frame. The control wrapper frame wraps a BAR frame carrying the BAR message. The trigger message is included in a field of the control frame wrapper. In certain configurations, the second PPDU carries an A-MPDU. The A-MPDU includes a trigger frame carrying the trigger message and a BAR frame carrying the BAR message.

Figure 11:
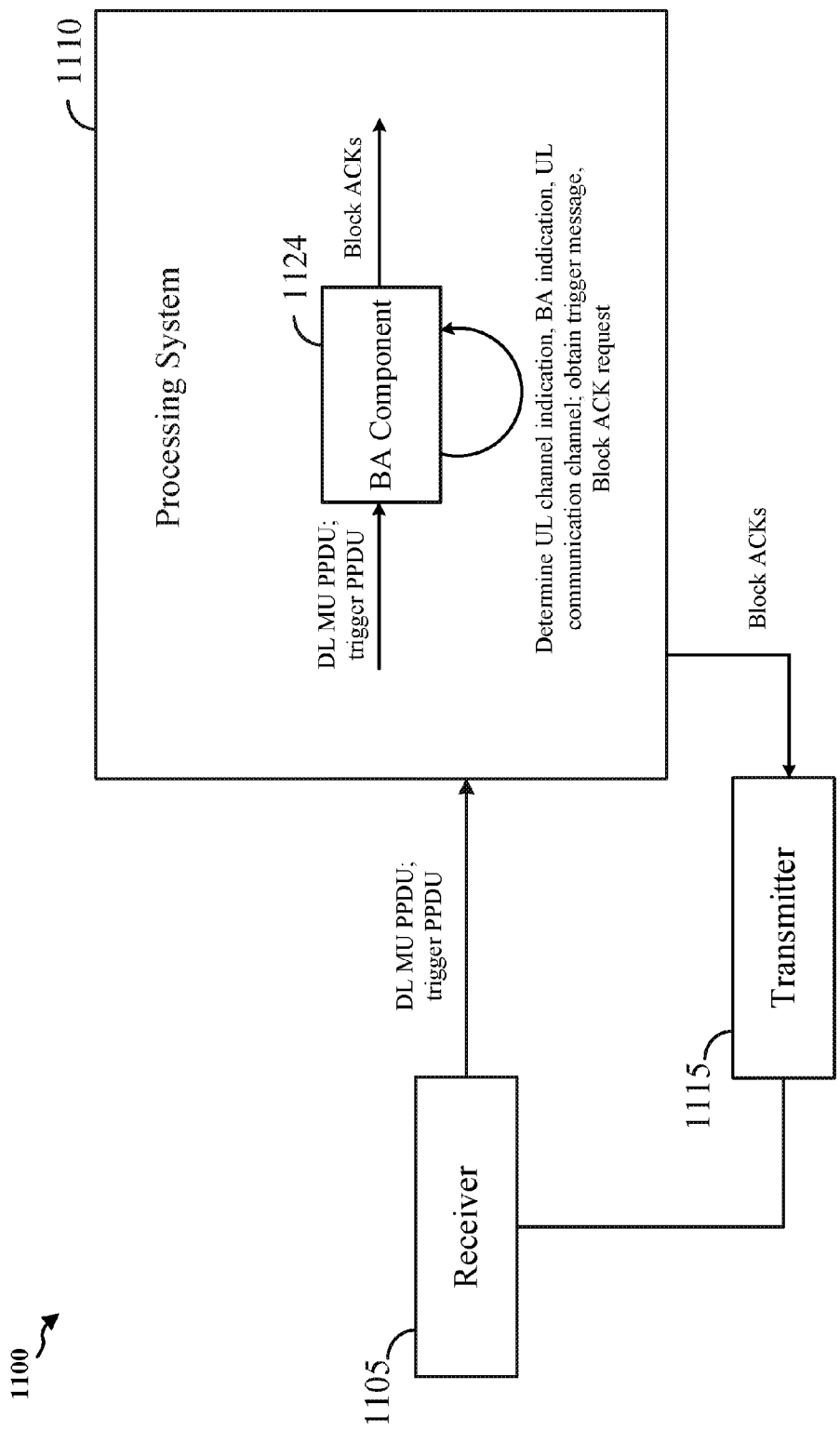
FIG. 11 is a functional block diagram of an example wireless communication device.

FIG. 11 is a functional block diagram of an example wireless communication device 1100. The wireless communication device 1100 may include a receiver 1105, a processing system 1110, and a transmitter 1115. The processing system 1110 may include a BA component 1124. The BA component 1124 may be configured to perform the various functions recited herein.

The wireless communication device 1100 may be a first user terminal. The receiver 1105, the processing system 1110, and/or the BA component 1124 may be configured to receive, on a first DL communication channel of a plurality of DL communication channels, a DL MUPPDU transmitted by an access point to a plurality of user terminals including the wireless communication device 1100 and a second user terminal on the plurality of DL communication channels. The DL MU PPDU may include a plurality of MPDUs. The transmitter 1115, the processing system 1110, and/or the BA component 1124 may be configured to transmit, on a first UL communication channel of a plurality of UL communication channels, a first BA to the access point concurrently with a transmission of a second BA from the second user terminal to the access point on a second UL communication channel of the plurality of UL communication channels. The first BA may acknowledge one or more MPDUs of the plurality of MPDUs. In another configuration, the processing system 1110 and/or the BA component 1124 may be configured to obtain an UL channel indication and a BA indication. The transmission of the first BA may be based on the UL channel indication and the BA indication. In another configuration, the processing system 1110 and/or the BA component 1124 may be configured to determine an UL communication channel that is reciprocal to the first DL communication channel based on DL channel allocation parameters of the first DL communication channel. The UL channel indication may be based on the DL channel allocation parameters, and the first UL communication channel may be the UL communication channel. In this configuration, each MPDU of the plurality of MPDUs may include an ACK policy that may instruct a receiving user terminal to transmit a BA immediately on one of the plurality of UL communication channels. The BA indication may include the ACK policy, and the first BA may be transmitted in response to detecting the ACK policy in the plurality of MPDUs. In another configuration, the processing system 1110 and/or the BA component 1124 may be configured to determine the UL communication channel by obtaining the DL channel allocation parameters of the first DL communication channel from the DL MU PPDU and by determining UL channel allocation parameters based on the DL channel allocation parameters. The reciprocal UL communication channel may be determined based on the UL channel allocation parameters. In another configuration, the processing system 1110 and/or the BA component 1124 may be configured to obtain UL channel allocation parameters of the plurality of UL communication channels from the DL MU PPDU. In this configuration, the UL channel allocation parameters may allocate equal bandwidth to each of the plurality of UL communication channels, the UL channel indication may be based on the UL channel allocation parameters, the first UL communication channel may be determined based on the UL channel allocation parameters. Further, each MPDU of the plurality of MPDUs may include an ACK policy that instructs a receiving user terminal to transmit a BA immediately on one of the plurality of UL communication channels, the BA indication may include the ACK policy, and the first BA may be transmitted in response to obtaining the UL channel allocation parameters and detecting the ACK policy in the plurality of MPDUs. In an aspect, the UL channel allocation parameters may be obtained from a preamble of the DL MU PPDU. In another configuration, the wireless communication device 1100 may be preconfigured with UL channel allocation parameters of the plurality of UL communication channels. The UL channel allocation parameters may allocate equal bandwidth to each of the plurality of UL communication channels. In this configuration, the processing system 1110 and/or the BA component 1124 may be configured to obtain the UL channel indication by determining a DL channel index of the first DL communication channel, in which the UL channel indication includes the DL channel index, and by determining a UL channel index of the first UL communication channel based on the DL channel index. The first UL communication channel may be determined based on the UL channel allocation parameters and the UL channel index. Each MPDU of the plurality of MPDUs ma include an ACK policy that instructs a receiving user terminal to transmit a BA immediately on one of the plurality of UL communication channels. The BA indication may include the ACK policy, and the first BA may be transmitted in response to detecting the ACK policy in the plurality of MPDUs and the determination of the UL channel index. In another configuration, the processing system 1110 and/or the BA component 1124 may be configured to obtain a trigger message from the DL MU PPDU. The trigger message may be placed in a preamble of the DL MU PPDU or in an A-MPDU within the DL MU PPDU addressed to the wireless communication device 1100 carried in the DL MU PPDU. The trigger message may instruct the wireless communication device 1100 to initiate UL transmission and includes UL channel allocation parameters. In this configuration, the first UL communication channel may be determined based on the UL channel allocation parameters, the UL channel indication may include the UL channel allocation parameters, each MPDU of the plurality of MPDUs may include an ACK policy that instructs a receiving user terminal to transmit a BA immediately on one of the plurality of UL communication channels, the BA indication may include the ACK policy and the trigger message, and the first BA may be transmitted in response to obtaining the trigger message and detecting the ACK policy in the plurality of MPDUs. In another aspect, the wireless communication device 1100 may be configured to transmit UL data after sending the first BA on the first UL communication channel. In another aspect, the A-MPDU may include a trigger frame that carries the trigger message, the trigger frame may not include an RA, and the wireless communication device 1100 may be configured to determine the RA of the trigger frame based on an RA of another frame in the A-MPDU. In another configuration, the processing system 1110 and/or the BA component 1124 may be configured to receive a trigger PPDU from the access point subsequent to receiving the DL MU PPDU and to obtain a trigger message from the trigger PPDU. The trigger message may instruct the wireless communication device 1100 to initiate UL transmission and may include UL channel allocation parameters. The UL channel indication may include the UL channel allocation parameters, and the first UL communication channel may be determined based on the UL channel allocation parameters. Each MPDU of the plurality of MPDUs may include an ACK policy that instructs a receiving user terminal to transmit a BA immediately upon receiving a trigger PPDU on one of the plurality of UL communication channels, the BA indication may include the ACK policy and the trigger message, and the first BA may be transmitted in response to obtaining the trigger message and detecting the ACK policy in the plurality of MPDUs. In another aspect, the trigger PPDU may include a trigger frame that carries the trigger message, and the trigger frame may further include an indication instructing a receiving user terminal to transmit a BA. In another configuration, the processing system 1110 and/or the BA component 1124 may be configured to receive a second PPDU from the access point subsequent to receiving the DL MU PPDU and to obtain a trigger message from the second PPDU. The trigger message may instruct the first user terminal to initiate UL transmission and may include UL channel allocation parameters. The UL channel indication may include the UL channel allocation parameters. In this configuration, the processing system 1110 and/or the BA component 1124 may be further configured to obtaining a BAR message from the second PPDU. The BAR message may instruct the first user terminal to transmit a BA. The first UL communication channel may be determined based on the UL channel allocation parameters. Each MPDU of the plurality of MPDUs may include an ACK policy that instructs a receiving user terminal to transmit a BA in response to receiving the BAR message. The BA indication may include the ACK policy, the trigger message, and the BAR message. The first BA may be transmitted in response to obtaining the trigger message and the BAR message. In another aspect, the trigger message may be placed in a preamble of the second PPDU, and the second PPDU may include a BAR frame carrying the BAR message. In another aspect, the second PPDU may carry a control wrapper frame, the control wrapper frame may wrap a BAR frame carrying the BAR message, and the trigger message may be included in a field of the control frame wrapper. In another aspect, the second PPDU may carry an A-MPDU, and the A-MPDU may include a trigger frame carrying the trigger message and a BAR frame carrying the BAR message.

In one configuration, the wireless communication device 1100 may include means for receiving, on a first DL communication channel of a plurality of DL communication channels, a DL MUPPDU transmitted by an access point to a plurality of user terminals including the wireless communication device 1100 and a second user terminal on the plurality of DL communication channels. The DL MU PPDU may include a plurality of MPDUs. The wireless communication device 1100 may include means for transmitting, on a first UL communication channel of a plurality of UL communication channels, a first BA to the access point concurrently with a transmission of a second BA from the second user terminal to the access point on a second UL communication channel of the plurality of UL communication channels. The first BA may acknowledge one or more MPDUs of the plurality of MPDUs. In another configuration, the wireless communication device 1100 may include means for obtaining an UL channel indication and a BA indication. The transmission of the first BA may be based on the UL channel indication and the BA indication. In another configuration, the wireless communication device 1100 may include means for determining an UL communication channel that is reciprocal to the first DL communication channel based on DL channel allocation parameters of the first DL communication channel. The UL channel indication may be based on the DL channel allocation parameters, and the first UL communication channel may be the UL communication channel. In this configuration, each MPDU of the plurality of MPDUs may include an ACK policy that may instruct a receiving user terminal to transmit a BA immediately on one of the plurality of UL communication channels. The BA indication may include the ACK policy, and the first BA may be transmitted in response to detecting the ACK policy in the plurality of MPDUs. In another configuration, the wireless communication device 1100 may include means for determining the UL communication channel by obtaining the DL channel allocation parameters of the first DL communication channel from the DL MU PPDU and by determining UL channel allocation parameters based on the DL channel allocation parameters. The reciprocal UL communication channel may be determined based on the UL channel allocation parameters. In another configuration, the wireless communication device 1100 may include means for obtaining UL channel allocation parameters of the plurality of UL communication channels from the DL MU PPDU. In this configuration, the UL channel allocation parameters may allocate equal bandwidth to each of the plurality of UL communication channels, the UL channel indication may be based on the UL channel allocation parameters, the first UL communication channel may be determined based on the UL channel allocation parameters. Further, each MPDU of the plurality of MPDUs may include an ACK policy that instructs a receiving user terminal to transmit a BA immediately on one of the plurality of UL communication channels, the BA indication may include the ACK policy, and the first BA may be transmitted in response to obtaining the UL channel allocation parameters and detecting the ACK policy in the plurality of MPDUs. In an aspect, the UL channel allocation parameters may be obtained from a preamble of the DL MU PPDU. In another configuration, the wireless communication device 1100 may be preconfigured with UL channel allocation parameters of the plurality of UL communication channels. The UL channel allocation parameters may allocate equal bandwidth to each of the plurality of UL communication channels. In this configuration, the wireless communication device 1100 may include means for obtaining the UL channel indication by determining a DL channel index of the first DL communication channel, in which the UL channel indication includes the DL channel index, and by determining a UL channel index of the first UL communication channel based on the DL channel index. The first UL communication channel may be determined based on the UL channel allocation parameters and the UL channel index. Each MPDU of the plurality of MPDUs ma include an ACK policy that instructs a receiving user terminal to transmit a BA immediately on one of the plurality of UL communication channels. The BA indication may include the ACK policy, and the first BA may be transmitted in response to detecting the ACK policy in the plurality of MPDUs and the determination of the UL channel index. In another configuration, the wireless communication device 1100 may include means for obtaining a trigger message from the DL MU PPDU. The trigger message may be placed in a preamble of the DL MU PPDU or in an A-MPDU within the DL MU PPDU addressed to the wireless communication device 1100 carried in the DL MU PPDU. The trigger message may instruct the wireless communication device 1100 to initiate UL transmission and includes UL channel allocation parameters. In this configuration, the first UL communication channel may be determined based on the UL channel allocation parameters, the UL channel indication may include the UL channel allocation parameters, each MPDU of the plurality of MPDUs may include an ACK policy that instructs a receiving user terminal to transmit a BA immediately on one of the plurality of UL communication channels, the BA indication may include the ACK policy and the trigger message, and the first BA may be transmitted in response to obtaining the trigger message and detecting the ACK policy in the plurality of MPDUs. In another aspect, the wireless communication device 1100 may be configured to transmit UL data after sending the first BA on the first UL communication channel. In another aspect, the A-MPDU may include a trigger frame that carries the trigger message, the trigger frame may not include an RA, and the wireless communication device 1100 may be configured to determine the RA of the trigger frame based on an RA of another frame in the A-MPDU. In another configuration, the wireless communication device 1100 may include means for receiving a trigger PPDU from the access point subsequent to receiving the DL MU PPDU and to obtain a trigger message from the trigger PPDU. The trigger message may instruct the wireless communication device 1100 to initiate UL transmission and may include UL channel allocation parameters. The UL channel indication may include the UL channel allocation parameters, and the first UL communication channel may be determined based on the UL channel allocation parameters. Each MPDU of the plurality of MPDUs may include an ACK policy that instructs a receiving user terminal to transmit a BA immediately upon receiving a trigger PPDU on one of the plurality of UL communication channels, the BA indication may include the ACK policy and the trigger message, and the first BA may be transmitted in response to obtaining the trigger message and detecting the ACK policy in the plurality of MPDUs. In another aspect, the trigger PPDU may include a trigger frame that carries the trigger message, and the trigger frame may further include an indication instructing a receiving user terminal to transmit a BA. In another configuration, the wireless communication device 1100 may include means for receiving a second PPDU from the access point subsequent to receiving the DL MU PPDU and to obtain a trigger message from the second PPDU. The trigger message may instruct the first user terminal to initiate UL transmission and may include UL channel allocation parameters. The UL channel indication may include the UL channel allocation parameters. In this configuration, the wireless communication device 1100 may include means for obtaining a BAR message from the second PPDU. The BAR message may instruct the first user terminal to transmit a BA. The first UL communication channel may be determined based on the UL channel allocation parameters. Each MPDU of the plurality of MPDUs may include an ACK policy that instructs a receiving user terminal to transmit a BA in response to receiving the BAR message. The BA indication may include the ACK policy, the trigger message, and the BAR message. The first BA may be transmitted in response to obtaining the trigger message and the BAR message. In another aspect, the trigger message may be placed in a preamble of the second PPDU, and the second PPDU may include a BAR frame carrying the BAR message. In another aspect, the second PPDU may carry a control wrapper frame, the control wrapper frame may wrap a BAR frame carrying the BAR message, and the trigger message may be included in a field of the control frame wrapper. In another aspect, the second PPDU may carry an A-MPDU, and the A-MPDU may include a trigger frame carrying the trigger message and a BAR frame carrying the BAR message.

For example, means for receiving may include the RX spatial processor 260m, the RX data processor 270m, the receiver 1105, the processing system 1110, the controller 280m, and/or the BA component 1124. Means for transmitting may include the TX spatial processor 290m, TX data processor 288m, the transmitter 1115, the processing system 1110, the controller 280m, and/or the BA component 1124. Means for obtaining an UL channel indicating may include the RX spatial processor 260m, the RX data processor 270m, the receiver 1105, the processing system 1110, the controller 280m, and/or the BA component 1124. Means for determining an UL communication channel may include the RX spatial processor 260m, the RX data processor 270m, the receiver 1105, the processing system 1110, the controller 280m, and/or the BA component 1124. Means for obtaining UL channel allocation parameters may include the RX spatial processor 260m, the RX data processor 270m, the receiver 1105, the processing system 1110, the controller 280m, and/or the BA component 1124. Means for obtaining may include the RX spatial processor 260m, the RX data processor 270m, the receiver 1105, the processing system 1110, the controller 280m, and/or the BA component 1124. Means for receiving may include the RX spatial processor 260m, the RX data processor 270m, the receiver 1105, the processing system 1110, the controller 280m, and/or the BA component 1124. Means for obtaining a trigger message may include the RX spatial processor 260m, the RX data processor 270m, the receiver 1105, the processing system 1110, the controller 280m, and/or the BA component 1124. Means for receiving the second PPDU may include the RX spatial processor 260m, the RX data processor 270m, the receiver 1105, the processing system 1110, the controller 280m, and/or the BA component 1124. Means for obtaining the trigger message from the second PPDU may include the RX spatial processor 260m, the RX data processor 270m, the receiver 1105, the processing system 1110, the controller 280m, and/or the BA component 1124. Means for obtaining the BAR message may include the RX spatial processor 260m, the RX data processor 270m, the receiver 1105, the processing system 1110, the controller 280m, and/or the BA component 1124.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a sub-combination or variation of a sub-combination.

The various illustrative logical blocks, components and circuits described in connection with the present disclosure may be implemented or performed with a general purpose processor, a DSP, an ASIC, an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer-readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a first user terminal, comprising:
   receiving, from an access point, a downlink (DL) multi-user (MU) physical layer convergence protocol (PLCP) protocol data unit (PPDU) (DL MU PPDU), wherein the DL MU PPDU includes: a first aggregate medium access control (MAC) protocol data unit (A-MPDU), a block acknowledgement (BA) trigger, and an acknowledgement policy that instructs the first user terminal when to transmit a BA to the access point, wherein the first A-MPDU includes a plurality of MPDUs, wherein the BA trigger is different from the acknowledgement policy; and
   transmitting, to the access point, a first BA based on the BA trigger and the acknowledgement policy, wherein the first BA acknowledges one or more MPDUs of the plurality of MPDUs.

2. The method of claim 1, wherein the first A-MPDU includes the BA trigger.

3. The method of claim 1, wherein each MPDU of the first A-MPDU includes the BA trigger.

4. The method of claim 1, wherein the DL MU PPDU includes a preamble that includes the BA trigger.

5. The method of claim 4, wherein the preamble includes an HE-SIG B field that includes the BA trigger.

6. The method of claim 1, wherein each MPDU of the first A-MPDU includes the acknowledgement policy.

7. The method of claim 1, wherein the acknowledgement policy that instructs the first user terminal when to transmit a BA to the access point includes a policy that instructs the first user terminal to transmit the first BA immediately upon receipt of the BA trigger.

8. The method of claim 1, wherein the acknowledgement policy that instructs the first user terminal when to transmit a BA to the access point includes a policy that instructs the first user terminal to transmit the first BA after a period of time upon receipt of the BA trigger, wherein the period of time is measured from an end point of the DL MU PPDU.

9. The method of claim 8, wherein the period of time includes a short interframe space (SIFS).

10. The method of claim 1, further comprising:
    transmitting data to the access point only after the first BA is transmitted to the access point.

11. A method of wireless communication by an access point, comprising:
    transmitting, to a first user terminal, a downlink (DL) multi-user (MU) physical layer convergence protocol (PLCP) protocol data unit (PPDU) (DL MU PPDU), wherein the DL MU PPDU includes: a first aggregate medium access control (MAC) protocol data unit (A-MPDU), a block acknowledgement (BA) trigger, and an acknowledgement policy that instructs the first user terminal when to transmit a BA to the access point, wherein the first A-MPDU includes a plurality of MPDUs, wherein the BA trigger is different from the acknowledgement policy; and
    receiving, from the first user terminal, a first BA based on the BA trigger and the acknowledgement policy, wherein the first BA acknowledges one or more MPDUs of the plurality of MPDUs.

12. The method of claim 11, wherein the first A-MPDU includes the BA trigger.

13. The method of claim 11, wherein each MPDU of the first A-MPDU includes the BA trigger.

14. The method of claim 11, wherein the DL MU PPDU includes a preamble that includes the BA trigger.

15. The method of claim 14, wherein the preamble includes an HE-SIG B field that includes the BA trigger.

16. The method of claim 11, wherein each MPDU of the first A-MPDU includes the acknowledgement policy.

17. The method of claim 11, wherein the acknowledgement policy that instructs the first user terminal when to transmit a BA to the access point includes a policy that instructs the first user terminal to transmit the first BA immediately upon receipt of the BA trigger.

18. The method of claim 11, wherein the acknowledgement policy that instructs the first user terminal when to transmit a BA to the access point includes a policy that instructs the first user terminal to transmit the first BA after a period of time upon receipt of the BA trigger, wherein the period of time is measured from an end point of the DL MU PPDU.

19. The method of claim 18, wherein the period of time includes a short interframe space (SIFS).

20. The method of claim 11, further comprising:
receiving data from the first user terminal only after the first BA is received from the first user terminal.

21. A first user terminal for wireless communication, comprising:
a memory; and
at least one processor coupled to the memory, wherein the at least one processor is configured to:
receive, from an access point, a downlink (DL) multi-user (MU) physical layer convergence protocol (PLCP) protocol data unit (PPDU) (DL MU PPDU), wherein the DL MU PPDU includes: a first aggregate medium access control (MAC) protocol data unit (A-MPDU), a block acknowledgement (BA) trigger, and an acknowledgement policy that instructs the first user terminal when to transmit a BA to the access point, wherein the first A-MPDU includes a plurality of MPDUs, wherein the BA trigger is different from the acknowledgement policy; and
transmit, to the access point, a first BA based on the BA trigger and the acknowledgement policy, wherein the first BA acknowledges one or more MPDUs of the plurality of MPDUs.

22. The first user terminal of claim 21, wherein the first A-MPDU includes the BA trigger.

23. The first user terminal of claim 21, wherein the DL MU PPDU includes a preamble that includes the BA trigger.

24. The first user terminal of claim 21, wherein the acknowledgement policy that instructs the first user terminal when to transmit a BA to the access point includes a policy that instructs the first user terminal to transmit the first BA immediately upon receipt of the BA trigger.

25. The first user terminal of claim 21, wherein the acknowledgement policy that instructs the first user terminal when to transmit a BA to the access point includes a policy that instructs the first user terminal to transmit the first BA after a period of time upon receipt of the BA trigger, wherein the period of time is measured from an end point of the DL MU PPDU.

26. A non-transitory computer-readable medium having code stored thereon that, when executed, causes a first user terminal to:
receive, from an access point, a downlink (DL) multi-user (MU) physical layer convergence protocol (PLCP) protocol data unit (PPDU) (DL MU PPDU), wherein the DL MU PPDU includes: a first aggregate medium access control (MAC) protocol data unit (A-MPDU), a block acknowledgement (BA) trigger, and an acknowledgement policy that instructs the first user terminal when to transmit a BA to the access point, wherein the first A-MPDU includes a plurality of MPDUs, wherein the BA trigger is different from the acknowledgement policy; and
transmit, to the access point, a first BA based on the BA trigger and the acknowledgement policy, wherein the first BA acknowledges one or more MPDUs of the plurality of MPDUs.

27. The non-transitory computer-readable medium of claim 26, wherein the first A-MPDU includes the BA trigger.

28. The non-transitory computer-readable medium of claim 26, wherein the DL MU PPDU includes a preamble that includes the BA trigger.

29. The non-transitory computer-readable medium of claim 26, wherein the acknowledgement policy that instructs the first user terminal when to transmit a BA to the access point includes a policy that instructs the first user terminal to transmit the first BA immediately upon receipt of the BA trigger.

30. The non-transitory computer-readable medium of claim 26, wherein the acknowledgement policy that instructs the first user terminal when to transmit a BA to the access point includes a policy that instructs the first user terminal to transmit the first BA after a period of time upon receipt of the BA trigger, wherein the period of time is measured from an end point of the DL MU PPDU.

31. An access point for wireless communication, comprising:
a memory; and
at least one processor coupled to the memory, wherein the at least one processor is configured to:
transmit, to a first user terminal, a downlink (DL) multi-user (MU) physical layer convergence protocol (PLCP) protocol data unit (PPDU) (DL MU PPDU), wherein the DL MU PPDU includes: a first aggregate medium access control (MAC) protocol data unit (A-MPDU), a block acknowledgement (BA) trigger, and an acknowledgement policy that instructs the first user terminal when to transmit a BA to the access point, wherein the first A-MPDU includes a plurality of MPDUs, wherein the BA trigger is different from the acknowledgement policy; and
receive, from the first user terminal, a first BA based on the BA trigger and the acknowledgement policy, wherein the first BA acknowledges one or more MPDUs of the plurality of MPDUs.

32. The access point of claim 31, wherein the first A-MPDU includes the BA trigger.

33. The access point of claim 31, wherein the DL MU PPDU includes a preamble that includes the BA trigger.

34. The access point of claim 31, wherein the acknowledgement policy that instructs the first user terminal when to transmit a BA to the access point includes a policy that instructs the first user terminal to transmit the first BA immediately upon receipt of the BA trigger.

35. The access point of claim 31, wherein the acknowledgement policy that instructs the first user terminal when to transmit a BA to the access point includes a policy that instructs the first user terminal to transmit the first BA after a period of time upon receipt of the BA trigger, wherein the period of time is measured from an end point of the DL MU PPDU.

36. A non-transitory computer-readable medium having code stored thereon that, when executed, causes an access point to:
transmit, to a first user terminal, a downlink (DL) multi-user (MU) physical layer convergence protocol (PLCP) protocol data unit (PPDU) (DL MU PPDU), wherein the DL MU PPDU includes: a first aggregate medium access control (MAC) protocol data unit (A-MPDU), a block acknowledgement (BA) trigger, and an acknowledgement policy that instructs the first user terminal when to transmit a BA to the access point, wherein the first A-MPDU includes a plurality of MPDUs, wherein the BA trigger is different from the acknowledgement policy; and receive, from the first user terminal, a first BA based on the BA trigger and the acknowledgement policy, wherein the first BA acknowledges one or more MPDUs of the plurality of MPDUs.

37. The non-transitory computer-readable medium of claim 36, wherein the first A-MPDU includes the BA trigger.

38. The non-transitory computer-readable medium of claim 36, wherein the DL MU PPDU includes a preamble that includes the BA trigger.

39. The non-transitory computer-readable medium of claim 36, wherein the acknowledgement policy that instructs the first user terminal when to transmit a BA to the access point includes a policy that instructs the first user terminal to transmit the first BA immediately upon receipt of the BA trigger.

40. The non-transitory computer-readable medium of claim 36, wherein the acknowledgement policy that instructs the first user terminal when to transmit a BA to the access point includes a policy that instructs the first user terminal to transmit the first BA after a period of time upon receipt of the BA trigger, wherein the period of time is measured from an end point of the DL MU PPDU.

* * * * *